(12) United States Patent
Pokrass et al.

(10) Patent No.: US 12,330,376 B2
(45) Date of Patent: *Jun. 17, 2025

(54) METHOD FOR ADDITIVE MANUFACTURING WITH PARTIAL CURING

(71) Applicant: Stratasys Ltd., Rehovot (IL)

(72) Inventors: Mariana Pokrass, Rehovot (IL); Lev Kuno, Tzur-Hadassah (IL); Eviatar Golan, Mazkeret-Batya (IL); Oren Zoran, Rehovot (IL)

(73) Assignee: Stratasys Ltd., Rehovot (IL)

( * ) Notice: Subject to any disclaimer, the term of this patent is extended or adjusted under 35 U.S.C. 154(b) by 133 days.

This patent is subject to a terminal disclaimer.

(21) Appl. No.: 17/846,061

(22) Filed: Jun. 22, 2022

(65) Prior Publication Data

US 2022/0324179 A1    Oct. 13, 2022

Related U.S. Application Data

(63) Continuation of application No. 17/280,324, filed as application No. PCT/IL2019/051069 on Sep. 27, 2019, now Pat. No. 11,376,799.

(Continued)

(51) Int. Cl.
*B33Y 10/00* (2015.01)
*B29C 35/08* (2006.01)
(Continued)

(52) U.S. Cl.
CPC .......... *B29C 64/40* (2017.08); *B29C 35/0805* (2013.01); *B29C 64/106* (2017.08);
(Continued)

(58) Field of Classification Search
CPC ... B29C 64/40; B29C 35/0805; B29C 64/106; B29C 2035/0827; B33Y 10/00;
(Continued)

(56) References Cited

U.S. PATENT DOCUMENTS

| 6,259,962 B1 | 7/2001 | Gothait |
| 6,569,373 B2 | 5/2003 | Napadensky |

(Continued)

FOREIGN PATENT DOCUMENTS

| CN | 103025506 | 4/2013 |
| CN | 103747943 | 4/2014 |

(Continued)

OTHER PUBLICATIONS

Material Safety Data Sheet of RGD515, available at https://www.sys-uk.com/wp-content/uploads/2016/01/MSDS-Objet-RGD515-English.pdf (Year: 2013).*

(Continued)

*Primary Examiner* — Xiao S Zhao
*Assistant Examiner* — Inja Song

(57) ABSTRACT

A method of additive manufacturing (AM) includes dispensing a first building material formulation to form an outer region, and dispensing a second building material formulation to form an inner region, the outer region surrounding the inner region, the inner and outer regions being shaped to form a layer of the object; exposing the layer to a first curing condition, repeating the dispensing and the exposing to sequentially form a plurality of layers of the object and collectively exposing the plurality of layers to a second curing condition. The selections are such that the first building material formulation is hardened to a higher degree than the second building formulation. The outer regions form a hardened coating that at least partially encapsulates the inner regions. The second curing condition is other than the first curing condition and is selected to increase the degree that the inner region is hardened.

6 Claims, 14 Drawing Sheets

Related U.S. Application Data

(60) Provisional application No. 62/738,041, filed on Sep. 28, 2018.

(51) Int. Cl.
    *B29C 64/106* (2017.01)
    *B29C 64/40* (2017.01)
    *B29K 105/00* (2006.01)

(52) U.S. Cl.
    CPC ...... *B33Y 10/00* (2014.12); *B29C 2035/0827* (2013.01); *B29K 2105/0094* (2013.01); *B29K 2995/0012* (2013.01); *B29K 2995/0026* (2013.01)

(58) Field of Classification Search
CPC .... B29K 2105/0094; B29K 2995/0012; B29K 2995/0026
See application file for complete search history.

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 7,991,498 B2 | 8/2011 | Kritchman |
| 9,031,680 B2 | 5/2015 | Napadensky |
| 9,227,365 B2 | 1/2016 | Dikovsky et al. |
| 9,780,440 B2 | 10/2017 | Onaka et al. |
| 9,873,761 B1 | 1/2018 | Das et al. |
| 9,999,509 B2 | 6/2018 | Dikovsky et al. |
| 10,052,861 B2 | 8/2018 | Wang et al. |
| 11,235,511 B2 | 2/2022 | Kuno |
| 11,613,071 B2 | 3/2023 | Kuno |
| 2005/0101684 A1* | 5/2005 | You ............ C08J 3/243 522/1 |
| 2006/0192315 A1 | 8/2006 | Farr et al. |
| 2010/0191360 A1* | 7/2010 | Napadensky ........ B33Y 80/00 700/98 |
| 2013/0040091 A1* | 2/2013 | Dikovsky ............ B29C 64/112 428/68 |
| 2015/0123298 A1* | 5/2015 | Napadensky ........... B29C 67/24 264/1.7 |
| 2015/0259548 A1* | 9/2015 | Wang ................ B29C 64/386 428/339 |
| 2016/0339643 A1 | 11/2016 | Dikovsky et al. |
| 2017/0106594 A1 | 4/2017 | Gardiner |
| 2017/0173886 A1 | 6/2017 | Menchik et al. |
| 2017/0282450 A1* | 10/2017 | Slep ............... B29C 64/112 |
| 2018/0001547 A1* | 1/2018 | Cuypers .............. A61L 15/12 |
| 2018/0117856 A1 | 5/2018 | Ochi |
| 2018/0243984 A1 | 8/2018 | Hayashida et al. |
| 2021/0268722 A1 | 9/2021 | Iwade et al. |
| 2021/0308938 A1 | 10/2021 | Kuno |
| 2021/0354398 A1 | 11/2021 | Pokrass et al. |
| 2022/0118682 A1 | 4/2022 | Kuno |
| 2023/0226747 A1 | 7/2023 | Kuno |

FOREIGN PATENT DOCUMENTS

| | | |
|---|---|---|
| CN | 108136677 | 6/2018 |
| CN | 108350145 | 7/2018 |
| GB | 2507953 | 5/2014 |
| JP | 2002-292751 | 10/2002 |
| JP | 2015-112836 | 6/2015 |
| JP | 2015-168067 | 9/2015 |
| WO | WO 2009/013751 | 1/2009 |
| WO | WO 2011/021403 | 2/2011 |
| WO | WO 2013/128452 | 9/2013 |
| WO | WO 2015/200179 | 12/2015 |
| WO | WO 2016/063282 | 4/2016 |
| WO | WO 2016/125170 | 8/2016 |
| WO | WO 2017/040883 | 3/2017 |
| WO | WO 2017/068590 | 4/2017 |
| WO | WO 2017/134672 | 8/2017 |
| WO | WO 2017/134673 | 8/2017 |
| WO | WO 2017/134674 | 8/2017 |
| WO | WO 2017/134676 | 8/2017 |
| WO | WO 2017/187434 | 11/2017 |
| WO | WO 2018/055521 | 3/2018 |
| WO | WO 2018/055522 | 3/2018 |
| WO | WO 2020/065654 | 4/2020 |
| WO | WO 2020/065655 | 4/2020 |

OTHER PUBLICATIONS

Material Data Sheet of RC535 (i.e., RGD535), available at https://3dprinting.co.uk/wp-content/uploads/2021/04/RGD535-MSDS.pdf. (Year: 2016).*
Material Data Sheet of DurusWhite (i.e., RGD430), available at https://www.sys-uk.com/wp-content/uploads/2016/01/Durus-White-RGD430-MSDS-English.pdf. (Year: 2013).*
Material Data Sheet of VeroGrey (i.e., RGD850), available at https://www.sys-uk.com/wp-content/uploads/2016/01/MSDS-Objet-VeroGray-RGD850-English.pdf. (Year: 2017).*
Communication Pursuant to Article 94(3) EPC Dated Feb. 16, 2024 From the European Patent Office Re. Application No. 19791377.5 (6 Pages).
Notice of Reason(s) for Rejection Dated Jun. 13, 2023 From the Japan Patent Office Re. Application No. 2021-516413. (4 pages).
Notice of Reasons of Rejection Dated Oct. 11, 2022 From the Japan Patent Office Re. Application No. 2021-516413. (5 Pages).
English Summary Dated Aug. 3, 202 of Notification of Office Action and Search Report Dated May 24, 2022 From the State Intellectual Property Office of the People's Republic of China Re. Application No. 201980070060.1. (5 Pages).
International Preliminary Report on Patentability Dated Apr. 8, 2021 From the International Bureau of WIPO Re. Application No. PCT/IL2019/051069. (8 Pages).
International Preliminary Report on Patentability Dated Apr. 8, 2021 From the International Bureau of WIPO Re. Application No. PCT/IL2019/051070. (6 Pages).
International Search Report and the Written Opinion Dated Jan. 14, 2020 From the International Searching Authority Re. Application No. PCT/IL2019/051069. (13 Pages).
International Search Report and the Written Opinion Dated Jan. 24, 2020 From the International Searching Authority Re. Application No. PCT/IL2019/051070. (11 Pages).
Notice of Allowance Dated Mar. 3, 2022 from the US Patent and Trademark Office Re. U.S. Appl. No. 17/280,324. (6 pages).
Notice of Allowance Dated Sep. 13, 2021 from the US Patent and Trademark Office Re. U.S. Appl. No. 17/280,956. (14 pages).
Notification of Office Action and Search Report Dated May 24, 2022 From the State Intellectual Property Office of the People's Republic of China Re. Application No. 201980070060.1. (8 Pages).
Office Action Dated Oct. 28, 2021 From the Israel Patent Office Re. Application No. 281855 and Its Translation Into English. (6 Pages).
Official Action Dated Nov. 18, 2021 from US Patent and Trademark Office Re. U.S. Appl. No. 17/280,324. (29 pages).
Bauer et al. "Cyanate Ester Based Resin Systems for Snap-Cure Applications", Microsystem Technologies, 8(1): 58-62, Mar. 2002.
Chandrasckaran ct al. "3D Printing of High Performance Cyanate Ester Thermosct Polymers", Journal of Material Chemistry A, XP002796791, 6(3): 853-858, Published Online Dec. 20, 2017.
Stratasys "Safety Data Sheets for Objet RGD515", Stratasys, 1-10, Jan. 22, 2021.

(56) References Cited

OTHER PUBLICATIONS

Notice of Reason(s) for Rejection Dated Apr. 14, 2023 From the Japan Patent Office Re. Application No. 2021-517579 and Its Translation Into English. (14 Pages).
Notice of Allowance Dated Jan. 11, 2023 from the US Patent and Trademark Office Re. U.S. Appl. No. 17/561,764. (26 pages).
Office Action Dated Jan. 8, 2023 From the Israel Patent Office Re. Application No. 294172. (7 Pages).
Communication Pursuant to Article 94(3) EPC Dated May 12, 2023 From the European Patent Office Re. Application No. 19794263.4 (4 Pages).
Notification of Office Action and Search Report Dated Jun. 22, 2022 From the State Intellectual Property Office of the People's Republic of China Re. Application No. 201980070055.0 and Its Translation of Office Action Into English. (11 Pages).
Notification of Office Action Dated Oct. 21, 2022 From the State Intellectual Property Office of the People's Republic of China Re. Application No. 201980070060.1 and Its Translation of Office Action Into English with Summary. (6 Pages).
Translation Dated Nov. 10, 2022 of Notice of Reasons of Rejection Dated Oct. 11, 2022 From the Japan Patent Office Re. Application No. 2021-516413. (4 Pages).
Notice of Reason(s) for Rejection Dated From the Japan Patent Office Re. Application No. 2021-517579 and Its Translation Into English. (5 Pages).
Translation Dated Jun. 29, 2023 of Notice of Reason(s) for Rejection Dated Jun. 13, 2023 From the Japan Patent Office Re. Application No. 2021-516413. (3 pages).
Office Action Dated Nov. 21, 2023 From the Israel Patent Office Re. Application No. 294172. (4 Pages).
Official Action Dated Mar. 25, 2024 From the US Patent and Trademark Office Re. U.S. Appl. No. 18/126,512. (33 Pages).
Official Action Dated Jul. 25, 2024 From the US Patent and Trademark Office Re. U.S. Appl. No. 18/126,512. (15 Pages).
Notice of Reason(s) for Rejection Dated Dec. 1, 2023 From the Japan Patent Office Re. Application No. 2021-517579 and Its Translation Into English. (5 Pages).
Notice of Allowance Dated Oct. 30, 2024 from the US Patent and Trademark Office Re. U.S. Appl. No. 18/126,512. (8 pages).

* cited by examiner

METHOD FOR ADDITIVE MANUFACTURING WITH PARTIAL CURING

RELATED APPLICATIONS

This application is a Continuation of U.S. patent application Ser. No. 17/280,324, filed on Mar. 26, 2021, which is a National Phase of PCT Patent Application No. PCT/IL2019/051069 having International Filing Date of Sep. 27, 2019, which claims the benefit of priority under 35 USC § 119(e) of U.S. Provisional Patent Application No. 62/738,041 filed on Sep. 28, 2018. The contents of the above applications are all incorporated by reference as if fully set forth herein in their entirety.

FIELD AND BACKGROUND OF THE INVENTION

The present invention, in some embodiments thereof, relates to additive manufacturing (AM), and, more particularly, but not exclusively, to novel formulation systems usable in, and method parameters for AM.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified. Curing may be by exposure to a suitable condition, and optionally by using a suitable device.

The building material includes an uncured model material (also referred to as "uncured modeling material" or "modeling material formulation"), which is selectively dispensed to produce the desired object, and may also include an uncured support material (also referred to as "uncured supporting material" or "support material formulation") which provides temporary support to specific regions of the object during building and assures adequate vertical placement of subsequent object layers. The supporting structure is configured to be removed after the object is completed.

In some known inkjet printing systems, the uncured model material is a photopolymerizable or photocurable material that is cured, hardened or solidified upon exposure to ultraviolet (UV) light after it is jetted. The uncured model material may be a photopolymerizable material formulation that has a composition which, after curing, gives a solid material with mechanical properties that permit the building and handling of the three-dimensional object being built. The material formulation may include a reactive (curable) component and a photo-initiator. The photo-initiator may enable at least partial solidification of the uncured support material by curing with the same UV light applied to form the model material. The solidified material may be rigid, or may have elastic properties. The support material is formulated to permit fast and easy cleaning of the object from its support. The support material may be a polymer, which is water-soluble and/or capable of swelling and/or breaking down upon exposure to a liquid solution, e.g. water, alkaline or acidic water solution. The support material formulation may also include a reactive (curable) component and a photo-initiator similar to that used for the model material formulation.

In order to be compatible with most of the commercially-available print heads utilized in a 3D inkjet printing system, the uncured building materials are known to feature the following characteristics: a relatively low viscosity (e.g., Brookfield viscosity of up to 50 cps, or up to 35 cps, preferably from 8 to 25 cps) at a working (e.g., jetting) temperature; surface tension from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds.

The hardened modeling material which forms the final object typically exhibits heat deflection temperature (HDT) which is higher than room temperature, in order to assure its usability. Desirably, the hardened modeling material exhibits HDT of at least 35° C. For an object to be stable at variable conditions, a higher HDT is known to be desirable. In most cases, it is also desirable that the object exhibits relatively high Izod Notched impact, e.g., higher than 50 or higher than 60 J/m.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680 and U.S. Published Application No. 20160339643, all by the same Assignee, and being hereby incorporated by reference in their entirety.

Several additive manufacturing processes, including three-dimensional inkjet printing, allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a building scan cycle or part thereof.

In a 3D inkjet printing process such as Polyjet™ (Stratasys® Ltd., Israel), the building material is selectively jetted from one or more inkjet print heads and/or nozzles and deposited onto a fabrication tray in consecutive layers according to a pre-determined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions. This is also referred to as digital ABS™, or D-ABS™.

The Polyjet™ technology allows control over the position and composition of each voxel (volume pixel), which affords enormous design versatility and digital programming of multi-material structures. Other advantages of the Polyjet™ technology is the very high printing resolution, up to 14 µm layer height, and the ability to print multiple materials simultaneously, in a single object. This multi-material 3D printing process often serves for fabrication of complex parts and structures that are comprised of elements having different stiffness, performance, color or transparency. New range of materials, programmed at the voxel level, can be created by the PolyJet™ printing process, using only few starting materials.

International Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus families), and including also objects made using Digital ABS, which contain a multi-material made of two starting materials (e.g., RGD515™ & RGD535/531™), and simulate properties of engineering plastic. Most of the currently practiced PolyJet™ materials are curable materials which harden or solidify upon exposure to radiation, mostly UV radiation and/or heat, with the most practiced materials being acrylic-based materials.

Acrylic-based materials typically feature non-optimal thermal stability (resistance to thermal deformation). For example, acrylic-based materials such as multi-functional acrylic materials, which feature, when hardened, Tg above 200° C., exhibit high volume shrinkage which often results in curling and/or deformation of the printed object.

Curable materials which feature low volume shrinkage when hardened include, for example, epoxides, polyurethanes, polyamides, benzoxazine and cyanate esters (CE). However, most of these materials are not compatible with the PolyJet™ methodology due to technological restrictions such as high viscosity of the modeling formulation containing same at the inkjet printing heads' working temperature, instability, and toxicity.

Additional background art includes WO 2009/013751; WO 2016/063282; WO 2016/125170; WO 2017/134672; WO 2017/134673; WO 2017/134674; WO 2017/134676; WO 2017/068590; WO 2017/187434; WO 2018/055521; and WO 2018/055522, all to the present assignee.

SUMMARY OF THE INVENTION

According to an aspect of some embodiments of the present invention there is provided a system and method for fabricating objects with at least one model material that is maintained in a partially solidified or not solidified state throughout the additive manufacturing process. In some example embodiments, the system and method additionally includes a post treatment process during which the partially solidified or not solidified material may be further solidified. In some example embodiments, the system is configured to solidify the object in a dual stage hardening process. The dual stage hardening process may include partial solidification of the object during the AM process to produce a green body object followed by post (e.g., thermal) treatment at the end of the AM process to complete the solidifying process. During the AM process, potential smearing of the partially solidified printed pixels may be avoided by fully solidifying at least a portion of the object. Optionally, the portion of the object that is fully solidified may define a relatively hard shell or relatively hard coating (a solidified shell or coating) that forms an exterior of the object in which the partially cured material is contained. In some example embodiments, the partially cured material has a liquid to jelly-like consistency.

According to some example embodiments, the system and method is configured to reduce object curling or deformation that result from volume shrinkage of materials during curing. Optionally, the system and method may enable printing with materials that undergo substantial shrinking and/or have a relatively high heat distortion temperature (HDT), e.g., have an HDT above 50° C. or above 70° C.

According to some example embodiments, the system and method is configured to improve degree of transparency of the material forming the object. In some additional example embodiments, the system and method is applied to manufacture objects with a higher throughput.

According to an aspect of some embodiments of the present invention there is provided a method of manufacturing a three-dimensional object via additive manufacturing (AM), the method comprising:

dispensing a first building material formulation to form an outer region, and dispensing a second building material formulation to form an inner region, the outer region surrounding the inner region, the inner and outer regions being shaped to form a layer of the object; and exposing the layer to a first curing condition, wherein the first and the second building material formulations and the first curing condition are selected such that upon the exposing, the first building material formulation is hardened to a higher degree than the second building formulation;

repeating the dispensing and the exposing to the first curing condition to sequentially form a plurality of layers of the object, wherein the outer regions form a hardened coating that at least partially encapsulates the inner regions; and collectively exposing the plurality of layers to a second curing condition, wherein the second curing condition is other than the first curing condition and wherein the second curing condition is selected to increase the degree that the inner region is hardened.

According to some of any of the embodiments described herein, the first and second building material formulations and the first curing condition are selected such that upon the exposing to the first curing condition, a change in a hardening parameter of the first formulation is higher than a change in a hardening parameter of the second formulation by at least 2-folds.

According to some of any of the embodiments described herein, the hardening parameter is viscosity and/or loss tangent.

According to some of any of the embodiments described herein, the first and second building material formulations and the first curing condition are selected such that upon the exposing to the first curing condition, a hardening kinetic parameter of the first formulation is higher than a hardening kinetic parameter of the second formulation by at least 2-folds.

According to some of any of the embodiments described herein, the hardening kinetic parameter is a rate of a change in a viscosity or a rate of a change in a loss tangent.

According to some of any of the embodiments described herein, the first and the second building material formulations and the first curing condition are selected such that upon the exposing to the first curing condition, a hardening degree of the first building material formulation is at least 70% and a hardening degree of the second building material formulation is no more than 50%.

According to some of any of the embodiments described herein, the second building material formulation comprises a second curable material and at least one of the first and the second building material formulations comprises an initiator for promoting hardening of the second curable material, and wherein the initiator is inactive or is partially active towards the hardening upon exposure to the first curing condition.

According to some of any of the embodiments described herein, a total amount of the initiator in the at least one of the first and second building material formulations is less than 50%, or less than 30%, by weight, of an amount of the initiator required for promoting hardening of at least 70% of the second curable material upon exposure to the first curing condition.

According to some of any of the embodiments described herein, the second building material formulation comprises at least two sub-formulations A and B, each comprising the second curable material, wherein an amount of the initiator in sub-formulation A is higher by at least 100% of an amount of the initiator in sub-formulation B, and wherein a weight ratio of sub-formulations A and B is lower than 0.5.

According to some of any of the embodiments described herein, dispensing the second building formulation is such that the sub-formulation A is dithered within the inner region.

According to some of any of the embodiments described herein, the first building material formulation comprises a first curable material and an initiator for promoting hardening of the first curable material, and wherein the initiator is active towards promoting the hardening upon exposure to the first curing condition.

According to some of any of the embodiments described herein, the first curing condition comprises irradiation.

According to some of any of the embodiments described herein, the irradiation is UV-irradiation.

According to some of any of the embodiments described herein, the first building material formulation comprises a first curable material which is a UV curable material, and a photo-initiator in an amount sufficient for promoting hardening of at least 70% of the first building material formulation upon exposure to the first curing condition.

According to some of any of the embodiments described herein, the second building material formulation comprises a second curable material which is a UV curable material, and a photo-initiator in an amount that promotes hardening of no more of 50% of the second building material formulation upon exposure to the first curing condition.

According to some of any of the embodiments described herein, the second building material formulation hardens upon exposure to heat energy (e.g., application of heat energy).

According to some of any of the embodiments described herein, at least one of the first and second building material formulations provides a transparent hardened material.

According to some of any of the embodiments described herein, the second building material formulation comprises a second curable material featuring, when hardened, a heat distortion temperature (HDT) above a steady state temperature of the plurality of layers during the AM process.

According to some of any of the embodiments described herein, the second building material formulation comprises a second curable material featuring, when hardened, a glass transition temperature (Tg) above a steady state temperature of the plurality of layers during the AM process.

According to some of any of the embodiments described herein, the second building material formulation comprises a second curable material featuring, when hardened, a heat distortion temperature (HDT) above 70° C.

According to some of any of the embodiments described herein, the second building material formulation comprises a second curable material featuring, when hardened, a glass transition temperature (Tg) above 70° C.

According to some of any of the embodiments described herein, the first building material formulation comprises a first curable material featuring, when hardened, a heat distortion temperature (HDT) below a steady state temperature of the plurality of layers during the AM process.

According to some of any of the embodiments described herein, the first building material formulation comprises a first curable material featuring, when hardened, a glass transition temperature (Tg) below a steady state temperature of the plurality of layers during the AM process.

According to some of any of the embodiments described herein, the first building material formulation comprises a first curable material featuring, when hardened, a heat distortion temperature (HDT) below 70° C.

According to some of any of the embodiments described herein, the first building material formulation comprises a first curable material featuring, when hardened, a glass transition temperature (Tg) below 70° C.

According to some of any of the embodiments described herein, the coating is configured to have a thickness that is less than 1 mm.

According to an aspect of some embodiments of the present invention there is provided a three-dimensional object obtainable by the method as described herein in any of the respective embodiments and any combination thereof.

According to an aspect of some embodiments of the present invention there is provided a green body obtainable by the method as described herein in any of the respective embodiments and any combination thereof, before exposing the layers to the second curing condition.

According to an aspect of some embodiments of the present invention there are provided kits comprising the first and second formulations as described herein in any of the respective embodiments.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings (including images). With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
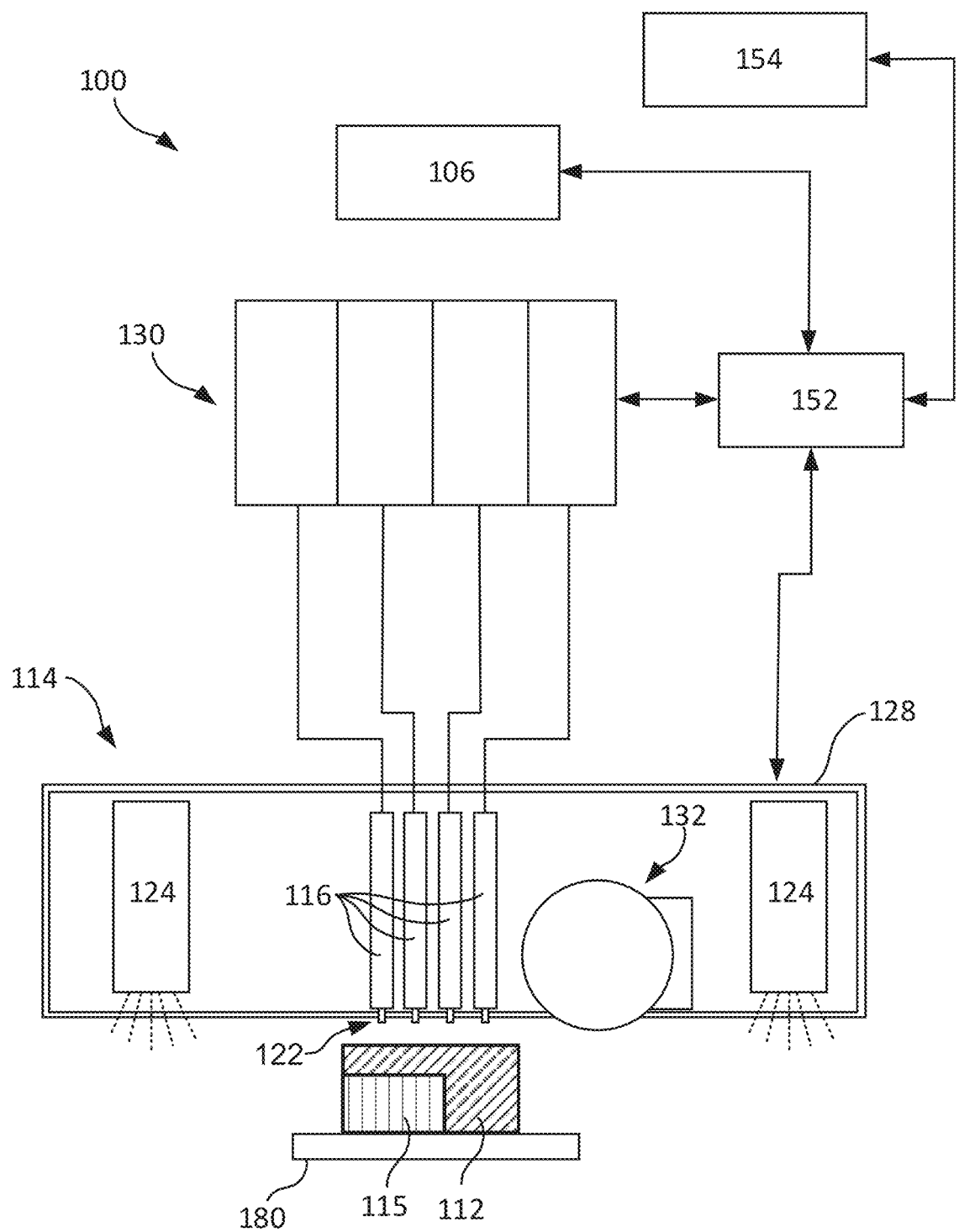
FIG. 1 is a simplified block diagram of an example ink-jet printing system for three dimensional printing for use with some example embodiments.

The present invention, in some embodiments thereof, relates to additive manufacturing (AM), and, more particularly, but not exclusively, to novel formulation systems usable in, and method parameters for AM.

The present inventors have designed and successfully practiced a method of additive manufacturing a three-dimensional object featuring improved properties while overcoming limitations associated with various model materials, as is discussed in further detail hereinafter. Herein throughout, the phrases "building material formulation", "uncured building material", "uncured building material formulation", "building material" and other variations therefore collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the term "object" describes a final product of the additive manufacturing. This term refers to the product obtained by a method as described herein, after removal of the support material, if such has been used as part of the uncured building material, and after post treatment (e.g., exposure to second curing condition as described herein). The object therefore typically consists (at least 95 weight percent) of a cured (hardened, solidified) modeling material or a combination of two or more modeling materials. In some applications, the object includes, in at least a portion thereof, partially cured and/or uncured modeling material(s).

The term "object" as used herein throughout refers to a whole object or a part thereof.

Herein throughout, the phrase "cured modeling material" which is also referred to herein as "hardened" or "solidified" modeling material describes the part of the building material that forms the object, as defined herein, upon exposing the dispensed building material to a curing condition (and optionally post-treatment), and, optionally, if a support material has been dispensed, removal of the cured support material, as described herein. The hardened modeling material can be a single hardened material or a mixture of two or more hardened materials, depending on the modeling material formulations used in the method, as described herein.

The phrases "cured modeling material", "hardened modeling material", "solidified modeling material" or "cured/hardened/solidified modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "modeling material" "model material" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing, may form the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling material formulations, and can be dispensed such that different parts of the object are made, upon being hardened, of different cured modeling formulations, and hence are made of different hardened (e.g., cured) modeling materials or different mixtures of hardened (e.g., cured) modeling materials.

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention, an object is manufactured by dispensing a building material that comprises two or more different modeling material formulations, each modeling material formulation from a different dispensing head and/or nozzle of the inkjet printing apparatus. The modeling material formulations are optionally and preferably concurrently deposited during the same pass of the printing heads. The modeling material formulations and/or combination of formulations within a layer are selected according to the desired properties of the object and according to the method parameters described herein.

According to some of any of the embodiments described herein, each of the modeling material formulations comprises one or more curable materials.

Herein throughout, a "curable material" or a "solidifiable material" is a compound (e.g., monomeric or oligomeric or polymeric compound) which, when exposed to a curing condition (e.g., curing energy), as described herein, solidifies or hardens to form a cured modeling material as defined herein. Curable materials are typically polymerizable materials, which undergo polymerization and/or cross-linking when exposed to a suitable energy source. A curable or solidifiable material is typically such that its viscosity increases by at least one order of magnitude when it is exposed to a curing condition.

In some of any of the embodiments described herein, a curable material can be a monomer, an oligomer or a short-chain polymer, each being polymerizable as described herein.

In some of any of the embodiments described herein, when a curable material is exposed to curing energy (e.g., radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to a curing condition at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to a curing condition at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition (e.g., curing energy).

A multi-functional curable material comprises two or more, e.g., 2, 3, 4 or more, functional groups that can undergo polymerization when exposed to a curing condition. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

Exemplary curable materials that are commonly used in additive manufacturing and in some of the present embodiments are acrylic materials.

Herein throughout, the term acrylic materials collectively encompass materials bearing one or more acrylate, methacrylate, acrylamide and/or methacrylamide group(s).

The curable materials included in the first and second formulations described herein may be defined by the properties provided by each material, when hardened. That is, the materials may be defined by properties of a material formed upon exposure to a curing condition, for example, upon polymerization. These properties (e.g., Tg, HDT), are of a polymeric material formed upon curing any of the described curable materials alone.

As used herein, each of the terms "curing" and "hardening" describes a process in which a formulation is hardened. These terms encompass polymerization of monomer(s) and/or oligomer(s) and/or cross-linking of polymeric chains (either of a polymer present before curing or of a polymeric material formed in a polymerization of the monomers or oligomers). The product of a curing reaction or of a hardening is therefore typically a polymeric material and in some cases a cross-linked polymeric material.

Partial curing or hardening as used herein encompasses a curing or hardening process that does not reach completion, that is, for example, a process that is effected up to a hardening degree, as defined hereinafter, which is less than 100%, less than 90%, or less than 80%. Material that is partially cured may stay in a liquid-jelly state. Complete curing or hardening as used herein is curing or hardening to a degree of at least 80%, or at least 90%, or of about 100%, for example, a curing or hardening process that results in a solidified material.

A "degree of hardening" as used herein represents the extent at which curing is effected, that is, the extent at which curable materials underwent polymerization and/or cross-linking. When a curable material is a polymerizable material, this phrase encompasses both a mol % of the curable materials in a formulation that underwent polymerization and/or cross-linking, upon exposure to a curing condition; and/or the degree at which polymerization and/or cross-linking was effected, for example, the degree of chain elongation and/or cross-linking. Determining a degree of polymerization can be performed by methods known to those skilled in the art.

A "green body object" as used herein is an object formed by an AM process that has at least a portion that only been partially hardened or solidified and requires additional hardening to obtain a fully solidified object.

Herein, the phrase "a condition that affects curing" or "a condition for inducing curing", which is also referred to herein interchangeably as "curing condition" or "curing inducing condition" describes a condition which, when applied to a formulation that contains a curable material, induces polymerization of monomer(s) and/or oligomer(s) and/or cross-linking of polymeric chains. Such a condition can include, for example, application of a curing energy, as described hereinafter, to the curable material(s), and/or contacting the curable material(s) with chemically reactive components such as catalysts, co-catalysts, and activators.

When a condition that induces curing comprises application of a curing energy, the phrase "exposing to a curing condition" means that the dispensed layers are exposed to the curing energy and the exposure is typically performed by applying a curing energy to the dispensed layers.

A "curing energy" typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material or system that undergoes curing upon exposure to radiation is referred to herein interchangeably as "photopolymerizable" or "photoactivatable" or "photocurable".

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein includes a polymerizable material that polymerizes via photo-induced radical polymerization.

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is affected by irradiating the dispensed layers by heat-inducing radiation. Such irradiation can be effected, for example, by means of an IR lamp or Xenon lamp, operated to emit radiation onto the deposited layer.

A curable material or system that undergoes curing upon exposure to heat is referred to herein as "thermally-curable" or "thermally-activatable" or "thermally-polymerizable".

Some curable materials can harden via thermal and/or photo-induced curing.

In some of any of the embodiments described herein, the method of the present embodiments uses a formulation system, which comprises two or more building material formulations (e.g., two or more modeling material formulations), which are dispensed and exposed to a curing condition such that at least one of the building material formulations is only partially cured or not cured during the AM process. Optionally, curing of the object may be completed in a post treatment process, e.g. by thermal curing or by maintaining the object in environmental conditions for a defined period of time, e.g. exposing the object to room temperature for a pre-determined period of time (a pre-defined number of hours). According to some example embodiments, the system may include a first building material formulation (also referred to herein interchangeably as a first modeling material formulation or as a reactive formulation) which includes one or more curable materials and an initiator that promotes hardening of the curable materials in the formulation when exposed to a curing condition (a first curing condition) and a second building material formulation (also referred to herein interchangeably as a second modeling material formulation or as a non-reactive formulation) includes curable material(s) without an initiator or with an initiator that is inactive or is partially active in promoting hardening of the curable material(s) when exposed to the curing condition (e.g., the first curing condition).

In some example embodiments, portions of the object that are configured to be partially cured or not cured are formed with the second building material formulation and portions of the object configured to be fully cured over the AM process are formed with the first building material formulation. In some example embodiments, the degree that the portion is cured may be controlled based on controllably doping a portion of the object that is configured for partial or no curing with the first building material formulation or with another reactive formulation. The degree of doping may define the degree of curing.

According to some example embodiments, the AM method includes forming a core of the object with the second building (e.g., modeling) material formulation and a shell or surface of the object with the first building (e.g., modeling) material formulation. Optionally, the core may be further cured in the post treatment process, by exposure to a second curing condition (e.g., thermal curing or by exposing the object to room temperature for a defined period of time).

In some example embodiments, the system and method is applied to prevent curling or deformation of objects during AM. In some example embodiments, the system and method is applied to improve transparency of transparent model materials. Photo-initiators may add an undesired tint to transparent model materials. Optionally, by reducing concentration of the photo-initiators the tinting may be significantly reduced or avoided. In some example embodiments, the system and method is applied to improve throughput. AM with the second building (e.g., modeling) material formulation may reduce the temperature buildup over the AM process. Typically, the scanning speed in the AM process is limited due to the temperature buildup since it is generally desired to maintain the object being built at a defined range of temperatures to reduce internal stress leading to deformations. Based on the reduced temperature achieved, the speed of the scanning and the throughput may be increased.

A disadvantage of only partially curing the material during the AM process is that it may result in smearing of the printed pixels and therefore in poor printing quality. According to some example embodiments, this disadvantage is avoided by fully curing a portion of the object during the AM process and partially curing or not curing another portion(s).

In some example embodiments, the portion that is fully cured is an outer portion of the object, e.g. a perimeter of a layer of the object and the portion that is partially cured is an inner portion of the object, e.g. an inner portion of the layer of the object encompassed by the perimeter of the layer. Optionally, the outer portion forms a shell of the object being printed and the inner portion that is partially cured or not cured forms a core of the object being printed. In some embodiments, the shell envelops the core. In some embodiments, the core is at least partially enveloped by the shell. Optionally, the shell may be a thin coating of one printed voxel thickness or may be a coating of 0.1 mm-2 mm thickness, e.g. 0.15 mm-0.3 mm thickness or 0.3 mm. The thickness may vary based on the size and shape of the object being printed and may at times be thicker than 2 mm.

For purposes of better understanding of some embodiments of the present invention, as illustrated in FIGS. 5A-14 of the drawings, reference is first made to the construction and operation of an ink-jet printing system for three dimensional printing as illustrated in FIGS. 1-4B.

A representative and non-limiting example of an inkjet printing system 100 suitable for AM of an object 112 according to some embodiments of the present invention is illustrated in FIG. 1. Inkjet printing system 100 may include inkjet printer 114 having a plurality of dispensing heads 116. Each head preferably includes an array of nozzles 122 through which a liquid building material is dispensed via inkjet technology. Optionally and preferably a building material supply system or apparatus 130 contains the building material containers or cartridges and supplies a plurality of building material formulations to dispensing heads 116 during printing. Each dispensing head 116 may be designated for dispensing one or more types of model material for forming object 112 and may also be designated for dispensing one or more types of support material for forming supporting structure 115 for object 112. Optionally, one dispensing head 116 may dispense a first building material formulation via a first set of nozzles in array 122 and a second building material formulation via a second set of nozzles in array 122. Although, in the representative example of FIG. 1, four dispensing heads 116 are illustrated, it is contemplated that inkjet printer 114 may optionally include fewer or more dispensing heads 116.

Inkjet printer 114 may also include a solidification system 124, e.g. hardening device, which can include any device configured to emit light, heat or the like and optionally and preferably harden one or more of the modeling material and the support material. For example, solidification system 124 may include an ultraviolet (UV) lamp that may cure or otherwise solidify the modeling material and optionally the support material. In some exemplary embodiments, inkjet printer 114 further includes a leveling device 132, e.g. a roller. Leveling device 132 may be configured to straighten, flatten and/or establish a defined layer thickness of a current layer prior to formation of the successive layer thereon.

Dispensing heads 116, solidification system 124 and leveling device 132 may be mounted on a frame or block 128 of inkjet printer 114 which is preferably operative to reciprocally move over a tray 180, which serves as the working surface. In some embodiments, solidification system 124 and leveling devices 132 are mounted in block 128 such that they follow in the wake of dispensing heads 116 to at least partially solidify (e.g., cure) the materials just dispensed by the dispensing heads. Optionally, tray 180 is configured to move in one or more directions in which block 128 is stationary.

A computerized controller 152 controls fabrication with inkjet printer 114 and optionally and preferably also controls supply system 330. Controller 152 typically includes one or more electronic circuits configured to perform the controlling operations. Controller 152 preferably communicates with a data processor 154 which transmits digital data pertaining to fabrication instructions based on computer object data, e.g., a CAD configuration represented on a computer readable medium in any of the aforementioned formats (e.g., STL). Typically, controller 152 controls the voltage applied to each dispensing head or nozzle array and the temperature of the building material in the respective printing head.

Once the manufacturing data is loaded to controller 152 it can operate without user intervention. In some embodiments, controller 152 receives additional input from the operator, e.g., using data processor 154 or using a user interface 106, e.g. a display with a keyboard, a touch screen and the like, communicating with controller 152. For example, controller 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 2A:
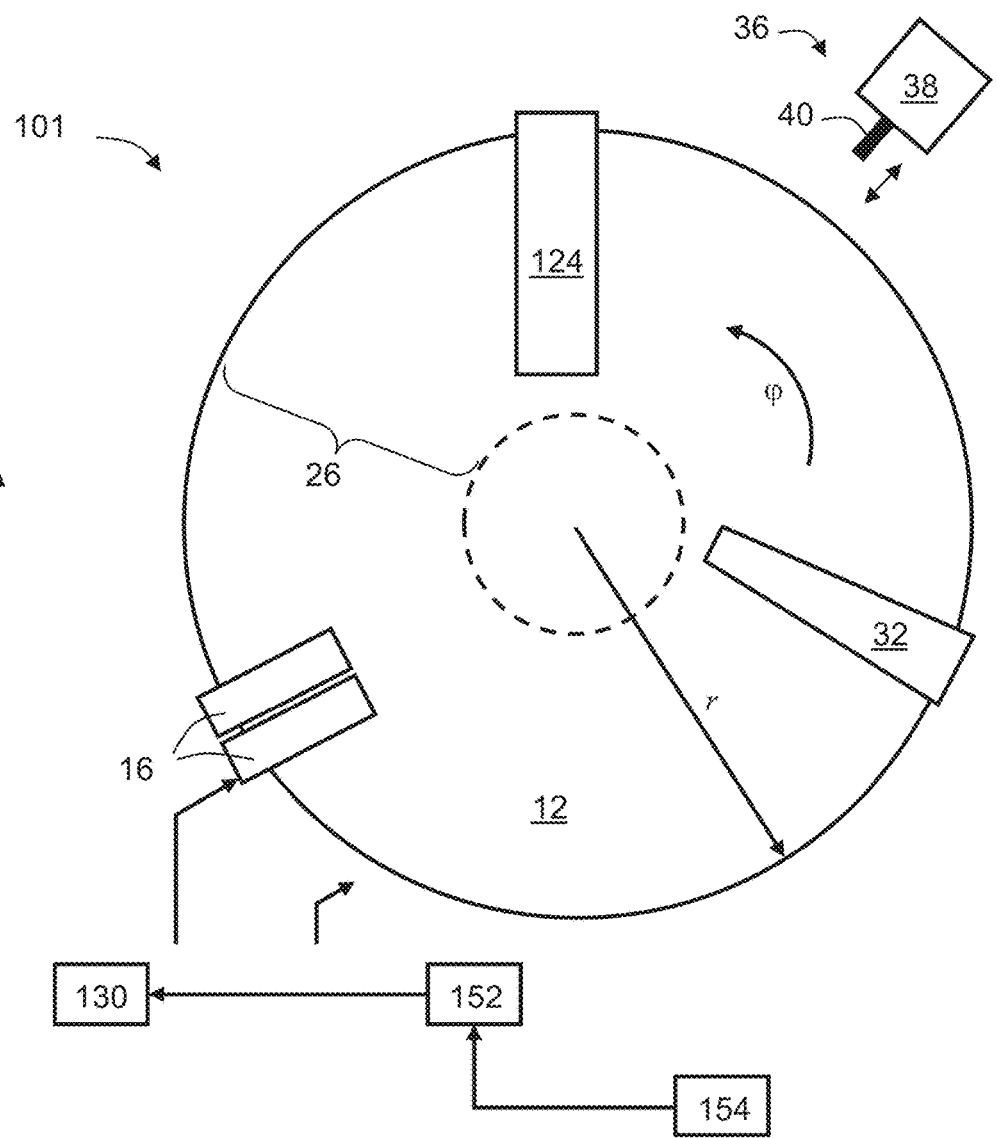
FIGS. 2A-2C are schematic illustrations of another additive manufacturing system according to some embodiments of the invention.
Figure 2B:
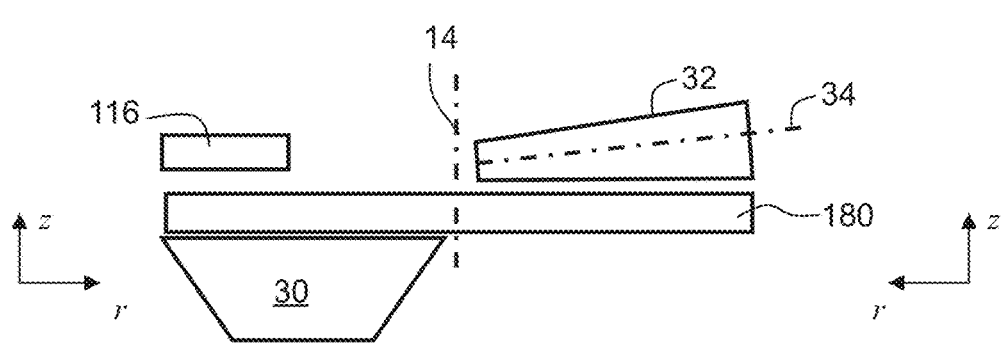
Figure 2C:
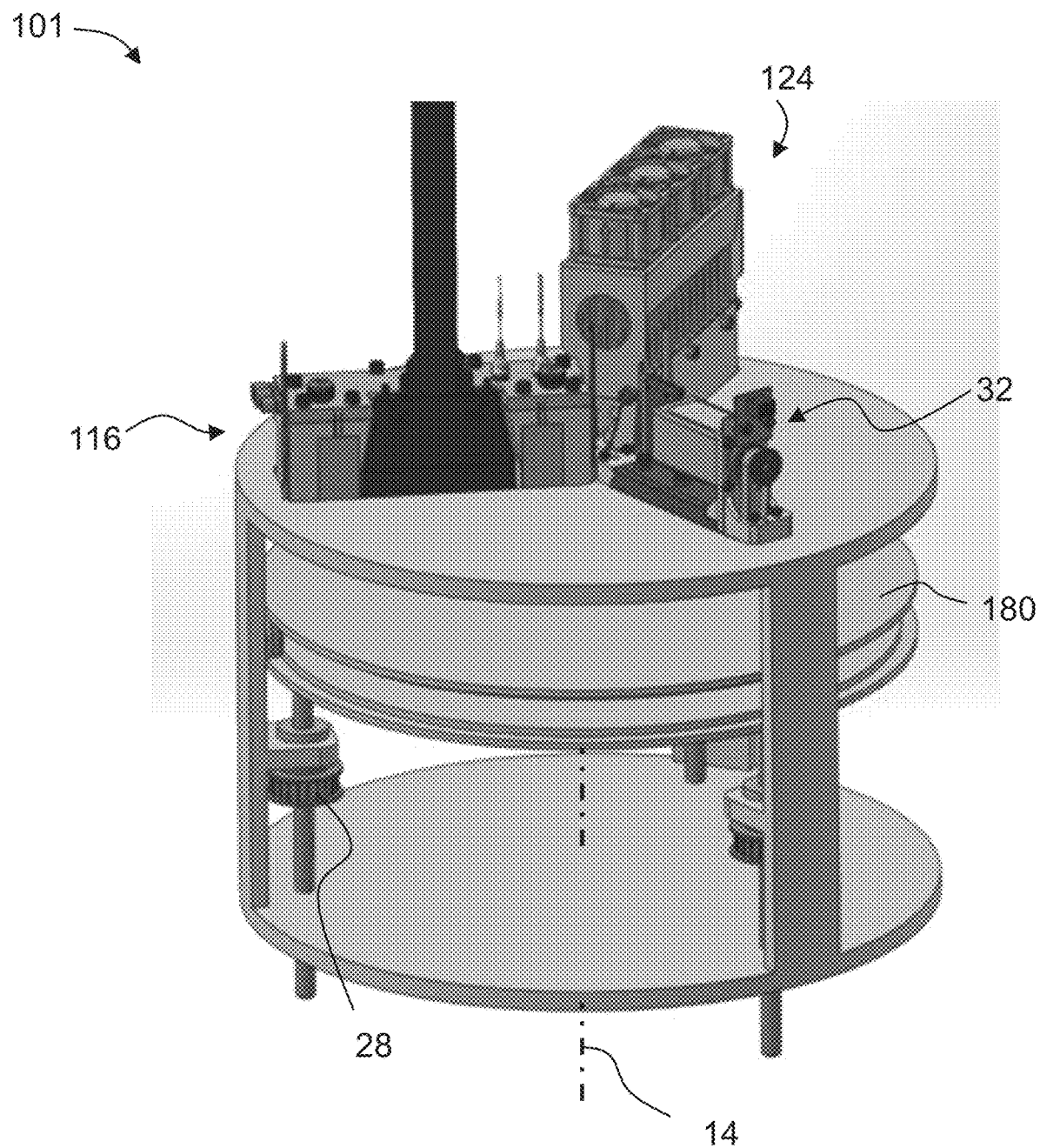

Another representative and non-limiting example of a system 101 suitable for AM of an object according to some embodiments of the present invention is illustrated in FIGS. 2A-2C. FIGS. 2A-2C illustrate a top view (FIG. 2A), a side view (FIG. 2B) and an isometric view (FIG. 2C) of system 101.

In the present embodiments, system 101 comprises a tray 180 and a plurality of inkjet printing heads 116, each having a plurality of separated nozzles. Tray 180 can have a shape of a disk or it can be annular. Non-round shapes are also contemplated, provided they can be rotated about a vertical axis.

Tray 180 and heads 116 are optionally and preferably mounted such as to allow a relative rotary motion between tray 180 and heads 116. This can be achieved by (i) configuring tray 180 to rotate about a vertical axis 14 relative to heads 116, (ii) configuring heads 116 to rotate about vertical axis 14 relative to tray 180, or (iii) configuring both tray 180 and heads 116 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 116, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 180 and pointing outwardly from axis 14 is referred to as the radial direction r, a direction parallel to tray 180 and perpendicular to the radial direction r is referred to herein as the azimuthal direction φ, and a direction perpendicular to tray 180 is referred to herein as the vertical direction z.

The term "radial position," as used herein, refers to a position on or above tray 180 at a specific distance from axis 14. When the term is used in connection to a printing head, the term refers to a position of the head which is at specific distance from axis 14. When the term is used in connection to a point on tray 180, the term corresponds to any point that belongs to a locus of points that is a circle whose radius is the specific distance from axis 14 and whose center is at axis 14.

The term "azimuthal position," as used herein, refers to a position on or above tray 180 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 180 serves as a supporting structure for three-dimensional printing. The working area on which one or objects are printed is typically, but not necessarily, smaller than the total area of tray 180. In some embodiments of the present invention the working area is annular. The working area is shown at 26. In some embodiments of the present invention tray 180 rotates continuously in the same direction throughout the formation of object, and in some embodiments of the present invention tray reverses the direction of rotation at least once (e.g., in an oscillatory manner) during the formation of the object. Tray 180 is optionally and preferably removable. Removing tray 180 can be for maintenance of system 101, or, if desired, for replacing the tray before printing a new object. In some embodiments of the present invention system 101 is provided with one or more different replacement trays (e.g., a kit of replacement trays), wherein two or more trays are designated for different types of objects (e.g., different weights) different operation modes (e.g., different rotation speeds), etc. The replacement of tray 180 can be manual or automatic, as desired. When automatic replacement is employed, system 101 comprises a tray replacement device 36 configured for removing tray 180 from its position below heads 116 and replacing it by a replacement tray (not shown). In the representative illustration of FIG. 2A tray replacement device 36 is illustrated as a drive 38 with a movable arm 40 configured to pull tray 180, but other types of tray replacement devices are also contemplated.

Figure 3A:
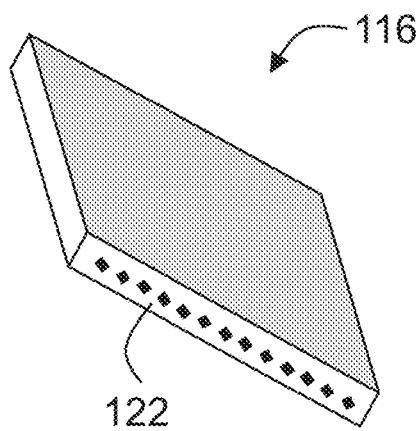
FIGS. 3A-3C are schematic illustrations of printing heads according to some embodiments of the present invention.
Figure 3B:
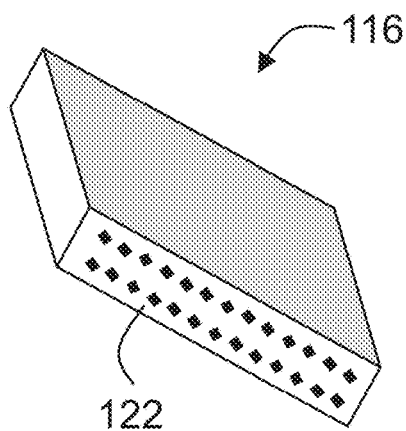
Figure 3C:
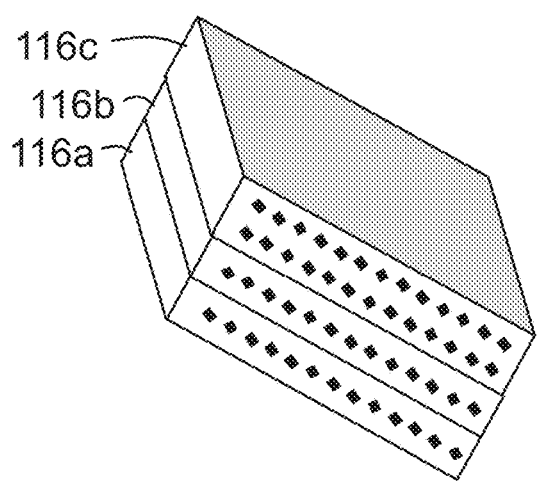

Exemplified embodiments for the printing head 116 are illustrated in FIGS. 3A-3C. These embodiments can be employed for any of the AM systems described above, including without limitation, system 100 and system 101.

FIGS. 3A-3B illustrate a printing head 116 with one (FIG. 3A) and two (FIG. 3B) nozzle arrays 122. The nozzles in the array are preferably aligned linearly, along a straight line. In embodiments in which a particular printing head has two or more linear nozzle arrays, the nozzle arrays are optionally and preferably can be parallel to each other.

When a system similar to system 100 is employed, all printing heads 116 are optionally and preferably oriented along the indexing direction with their positions along the scanning direction being offset to one another.

When a system similar to system 101 is employed, all printing heads 116 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 116a, 116b, 116c is illustrated in FIG. 3C.

In some embodiments, system 101 comprises a stabilizing structure 30 positioned below heads 116 such that tray 180 is between support structure 30 and heads 116. Stabilizing structure 30 may serve for preventing or reducing vibrations of tray 180 that may occur while inkjet printing heads 116 operate. In configurations in which printing heads 116 rotate about axis 14, stabilizing structure 30 preferably also rotates such that stabilizing structure 30 is always directly below heads 116 (with tray 180 between heads 116 and tray 180).

Tray 180 and/or printing heads 116 is optionally and preferably configured to move along the vertical direction z, parallel to vertical axis 14 so as to vary the vertical distance between tray 180 and printing heads 116. In configurations in which the vertical distance is varied by moving tray 180 along the vertical direction, stabilizing structure 30 preferably also moves vertically together with tray 180. In configurations in which the vertical distance is varied by heads 116 along the vertical direction, while maintaining the vertical position of tray 180 fixed, stabilizing structure 30 is also maintained at a fixed vertical position.

The vertical motion can be established by a vertical drive 28. Once a layer is completed, the vertical distance between tray 180 and heads 116 can be increased (e.g., tray 180 is lowered relative to heads 116) by a predetermined vertical step, according to the desired thickness of the layer subsequently to be printed. The procedure is repeated to form a three-dimensional object in a layer-wise manner.

In some embodiments of the invention, system 101 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 180 and its surface is parallel to the surface of the tray. This embodiment is illustrated in the side view of system 101 (FIG. 2B).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 180).

In some embodiments of the present invention printing heads 116 are configured to reciprocally move relative to tray along the radial direction r. These embodiments are useful when the lengths of the nozzle arrays 122 of heads 116 are shorter than the width along the radial direction of the working area 26 on tray 180. The motion of heads 116 along the radial direction is optionally and preferably controlled by controller 152.

Any of systems 100 and 101 may optionally and preferably comprise a solidifying device 124 which can include any device configured to emit light, heat or the like that may cause the deposited material formulation to harden. For example, solidifying device 124 can comprise one or more radiation sources, which can be, for example, an ultraviolet or visible or infrared lamp, or other sources of electromagnetic radiation, or electron beam source, depending on the building material formulation being used. The radiation source can include any type of radiation emitting device, including, without limitation, light emitting diode (LED), digital light processing (DLP) system, resistive lamp and the like. In some embodiments of the present invention, solidifying device 124 serves for curing or solidifying the building material formulation, e.g. the model material and the support material.

In any of systems 100 and 101, the operation of the inkjet printing heads and optionally and preferably also of one or more other components of the system, e.g., the motion of the tray, the operation of the supply system, the activation, deactivation, applied voltage, and position along the vertical and/or horizontal direction of the leveling device and/or the solidifying device, etc. are controlled by a controller 152. The controller can have an electronic circuit and a non-volatile memory medium readable by the circuit, wherein the memory medium stores program instructions which, when read by the circuit, cause the circuit to perform control operations as further detailed below.

The controller preferably communicates with a data processor or host computer 154 which transmits digital data pertaining to fabrication instructions based on computer object data, e.g., a Computer-Aided Design (CAD) configuration represented on a computer readable medium in a form of a Standard Tessellation Language (STL) or a Stereo-Lithography Contour (SLC) format, Virtual Reality Modeling Language (VRML), Additive Manufacturing File (AMF) format, Drawing Exchange Format (DXF), Polygon File Format (PLY) or any other format suitable for CAD. Typically, the controller controls the voltage applied to each dispensing head or nozzle array and the temperature of the building material formulation in the respective printing head. Generally, controller 152 controls printing heads to dispense, droplets of building material formulation in layers, such as to print a three-dimensional object. In system 101, controller 152 optionally and preferably controls the printing heads to dispense the droplets while the tray is rotating.

In some embodiments, the controller receives additional input from the operator, e.g., using data processor 154 or using a user interface 116 communicating with the controller. User interface 116 can be of any type known in the art, such as, but not limited to, a keyboard, a touch screen and the like. For example, controller 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

The object data formats are typically structured according to a Cartesian system of coordinates. In these cases, when system 101 is employed, computer 154 preferably executes a procedure for transforming the coordinates of each slice in the computer object data from a Cartesian system of coordinates into a polar system of coordinates. Computer 154 optionally and preferably transmits the fabrication instructions in terms of the transformed system of coordinates. Alternatively, computer 154 can transmit the fabrication instructions in terms of the original system of coordinates as provided by the computer object data, in which case the transformation of coordinates is executed by the circuit of controller 152.

Figure 4A:
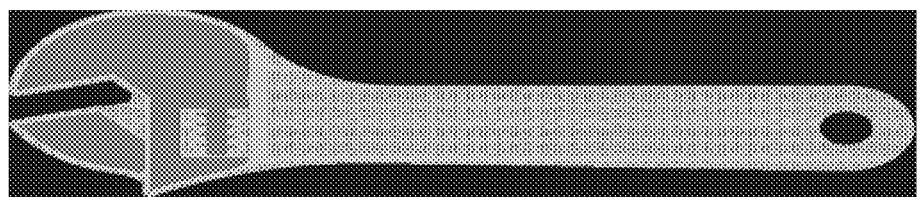
FIGS. 4A and 4B are schematic illustrations demonstrating coordinate transformations according to some embodiments of the present invention.
Figure 4B:
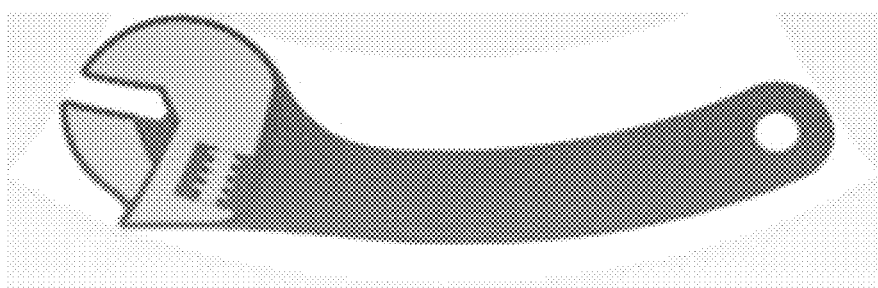

The transformation of coordinates allows three-dimensional printing over a rotating tray. In system 101, not all the nozzles of the head points cover the same distance over tray 180 during at the same time. The transformation of coordinates is optionally and preferably executed so as to ensure equal amounts of excess building material formulation at different radial positions. Representative examples of coordinate transformations according to some embodiments of the present invention are provided in FIGS. 4A-4B, showing three slices of an object (each slice corresponds to fabrication instructions of a different layer of the objects), where FIG. 4A illustrates a slice in a Cartesian system of coordinates and FIG. 4B illustrates the same slice following an application of a transformation of coordinates procedure to the respective slice.

Some embodiments contemplate the fabrication of an object by dispensing different building material formulations from different dispensing heads. These embodiments provide, inter alia, the ability to select material formulations from a given number of building material formulations and define desired combinations of the selected material formulations and their properties. According to the present embodiments, the spatial locations of the deposition of each material formulation with the layer is defined, either to effect occupation of different three-dimensional spatial locations by different building material formulations, or to effect occupation of substantially the same three-dimensional location or adjacent three-dimensional locations by two or more different building material formulations so as to allow post deposition spatial combination of the building material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application Nos. 20100191360 and 20170173886, the contents of which are hereby incorporated by reference.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 5A:
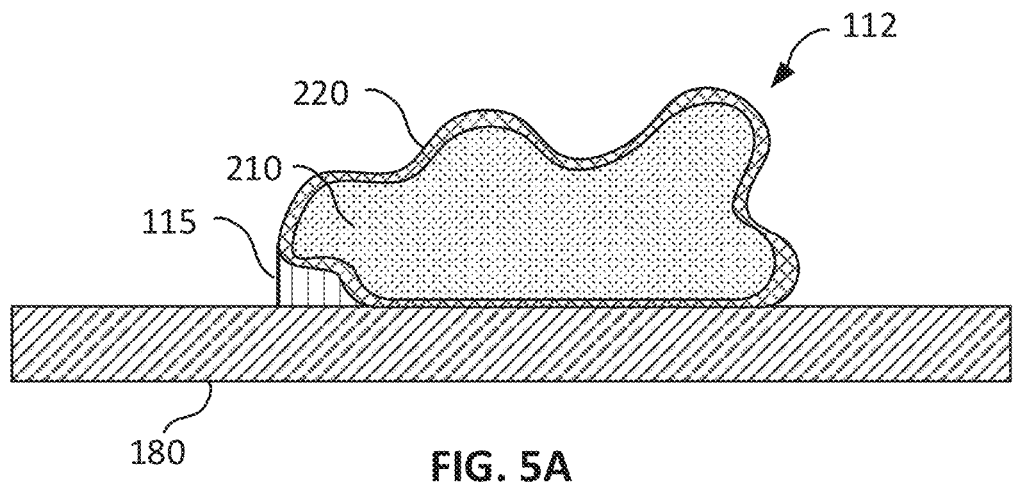
FIGS. 5A and 5B are simplified schematic drawings of a cross sectional view of an object fabricated with a core filled with a non-reactive building material formulation encompassed by a shell formed with a reactive building material formulation and a top view of a single layer of the object respectively, both in accordance with some example embodiments.
Figure 5B:
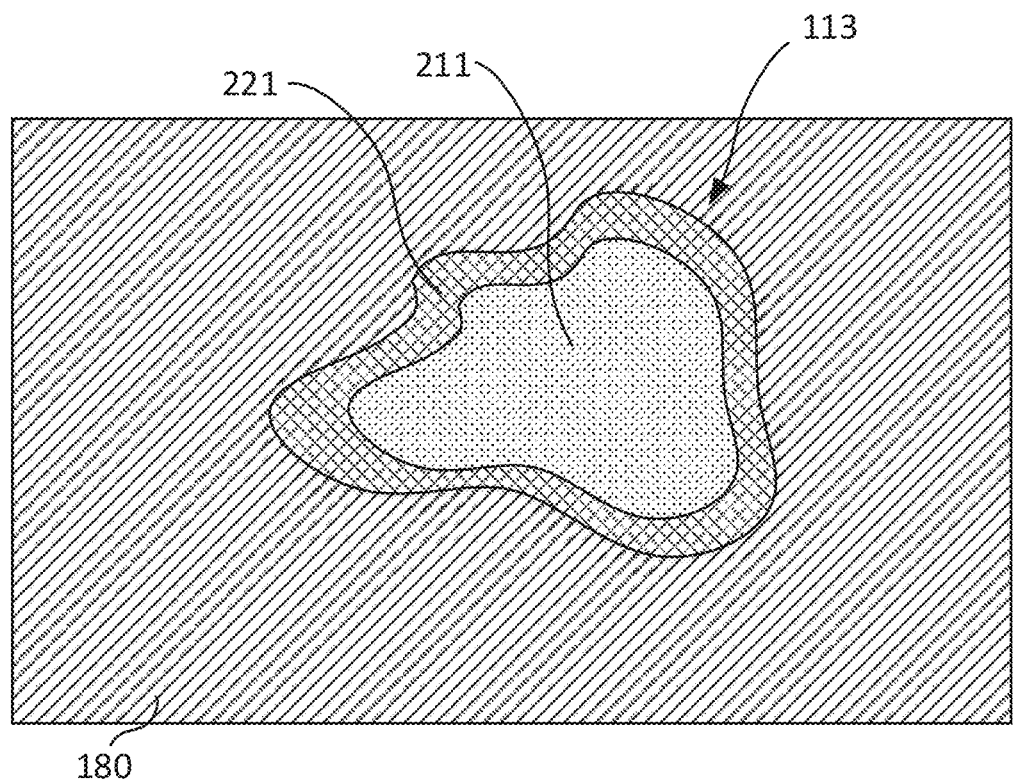

Reference is now made to FIGS. 5A and 5B showing simplified schematic drawings of a cross sectional view of an object fabricated with a core filled with a non-reactive formulation encompassed by a shell formed with a reactive formulation, and a top view of a single layer of the object respectively, both in accordance with some example embodiments. According to some example embodiments, an object 112 may include a core 210 that is formed with a second building (e.g., modeling) material formulation or a non-reactive formulation configured to be partially cured during the AM process and a shell 220 formed with a first building (e.g., modeling) material formulation or a reactive formulation that is configured to be fully cured during the AM process. Optionally, one or more support structures 115 may be formed to support object 112. The support structure may be solidified by curing during the AM process. According to some example embodiments, core 210 is maintained in a semi-solidified state, e.g. liquid-jelly state during the AM process while shell 220 is solidified during the AM process.

Referring now to FIG. 5B, according to some example embodiments, during the AM process, a layer 113 may be printed with an outer region 221 formed with the first building (e.g., modeling) material formulation that may define a perimeter of layer 113 and an inner region 211 formed with the second building (e.g., modeling) material formulation that is at least partially encompassed by outer region 221. According to some example embodiments, a plurality of layers that form object 112 are formed in a manner similar to layer 113 including both outer region 221 and inner region 211. The plurality of layers may optionally form shell 220 and core 210. Shell 220 may be defined to encapsulate core 210. In other example embodiments, object 112 may not be fully encapsulated by shell 220. A thickness of outer region 221 may be defined to have a thickness of one printed voxel or a thickness of 0.1-2 mm, e.g. 0.3-1 mm or 0.3 mm.

Optionally, the first building (e.g., modeling) material formulation applied to form outer region 221 is reactive and includes a photo-initiator. As such the first building material formulation solidifies based on a curing process, e.g. UV radiation radiated during the AM process. In some example embodiments, inner region 211 formed with the second building (e.g., modeling) material formulation may include relatively low concentration or no photo-initiator and may not solidify or may not fully solidify with the radiation, e.g. the UV radiation radiated during the AM process. Rather, core 210 formed with a plurality of inner regions 211 may be solidified in a post treatment process, e.g. thermal curing process. In some example embodiments a concentration of photo-initiator in the formulation of inner region 211 may be between 0.02 wt. %-0.1 wt. while the concentration of photo-initiator in the formulation of outer region 221 may be between 2 wt. %-5 wt. %.

In some example embodiments, the second building (e.g., modeling) material formulation used to form inner region 211 is prone to shrinking when cured. Second building (e.g., modeling) material formulation when hardened may for example have a Tg and/or HDT above a printing temperature of steady state temperature of object 112 during printing, e.g. 50° C.-90° C. or above 70° C.

Figure 6A:
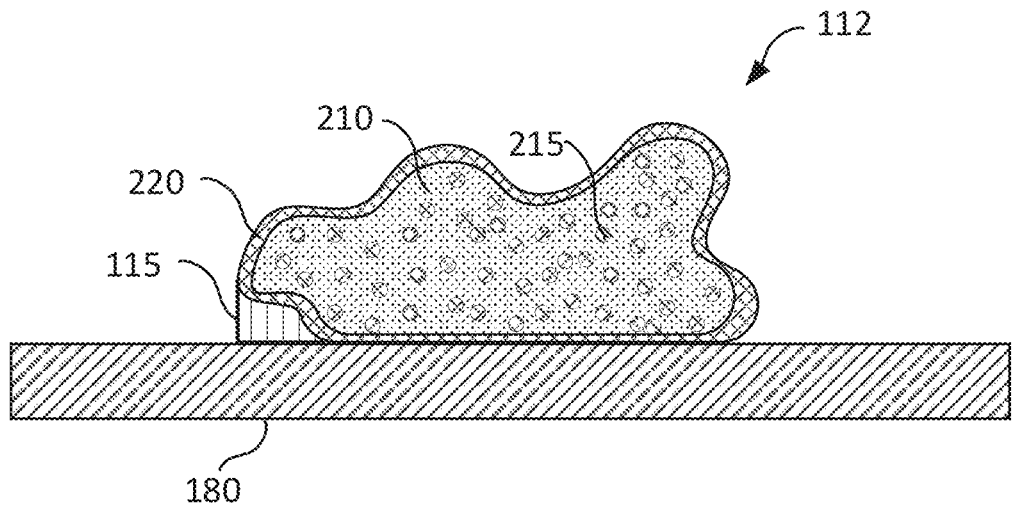
FIGS. 6A and 6B are simplified schematic drawings of a cross sectional view of an object fabricated with a core filled with non-reactive building material formulation, dithered with a reactive building material formulation and encompassed by another reactive building material formulation and a top view of a single layer of the object respectively, both in accordance with some example embodiments.
Figure 6B:
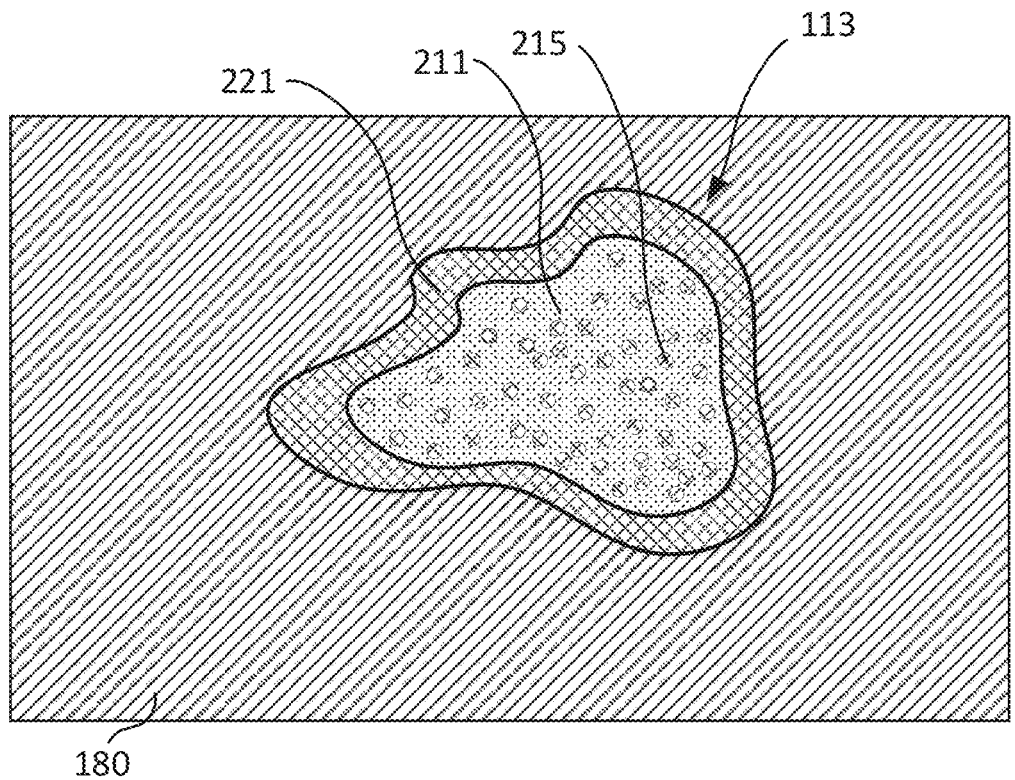

FIGS. 6A and 6B show simplified schematic drawings of a cross sectional view of an object fabricated with a core filled with non-reactive formulation (e.g., a sub-formulation of a second formulation as described herein, or a second formulation as described herein), dithered with a reactive formulation (e.g., another sub-formulation of a second formulation as described herein, or a first formulation as described herein, respectively) and encompassed by another reactive formulation (a first formulation as described herein) and a top view of a single layer of the object respectively, both in accordance with some example embodiments. In some example embodiments, a degree at which core 210 is solidified may be controlled by selectively dithering inner region 211 with drops 215 of the first building material formulation or other reactive formulation (e.g., a sub-formulation of the second formulation as described herein). In some example embodiments, a concentration of dithering is adapted to geometry of object 112 or layer 113 so that some portions of object 112 or layer 113 may be solidified to a higher degree than other portions.

Figure 7:
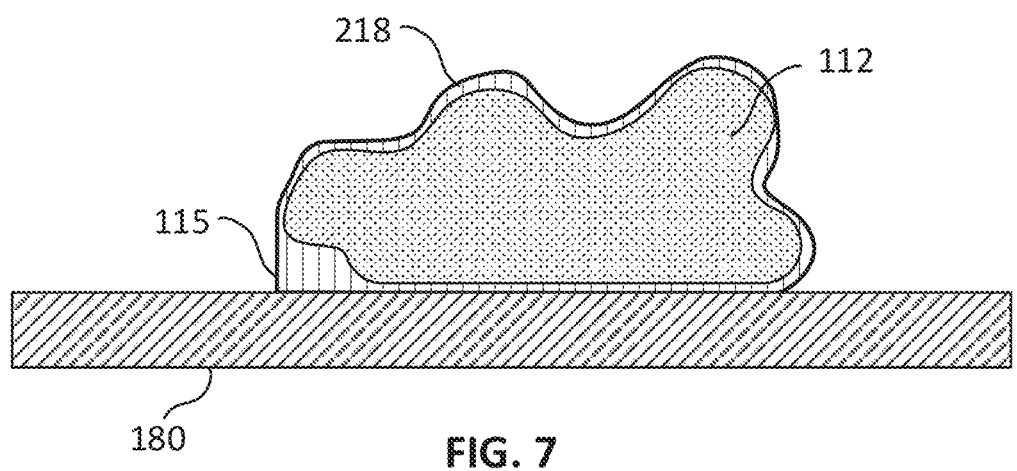
FIG. 7 is a simplified schematic drawing of a cross-sectional view of an object encapsulated in support material in accordance with some example embodiments.

FIG. 7 is a simplified schematic drawing of a cross-sectional view of an object encapsulated in support material in accordance with some example embodiments. According to some example embodiments, support material 115 is applied to form a shell 218 that encapsulates object 112 formed with a non-reactive formulation. Shell 218 formed with support material is external to object 112 and may be sacrificial, e.g. removed after post treating object 112 with support material 115. Support material 115 may be fully cured during the AM process.

Figure 8:
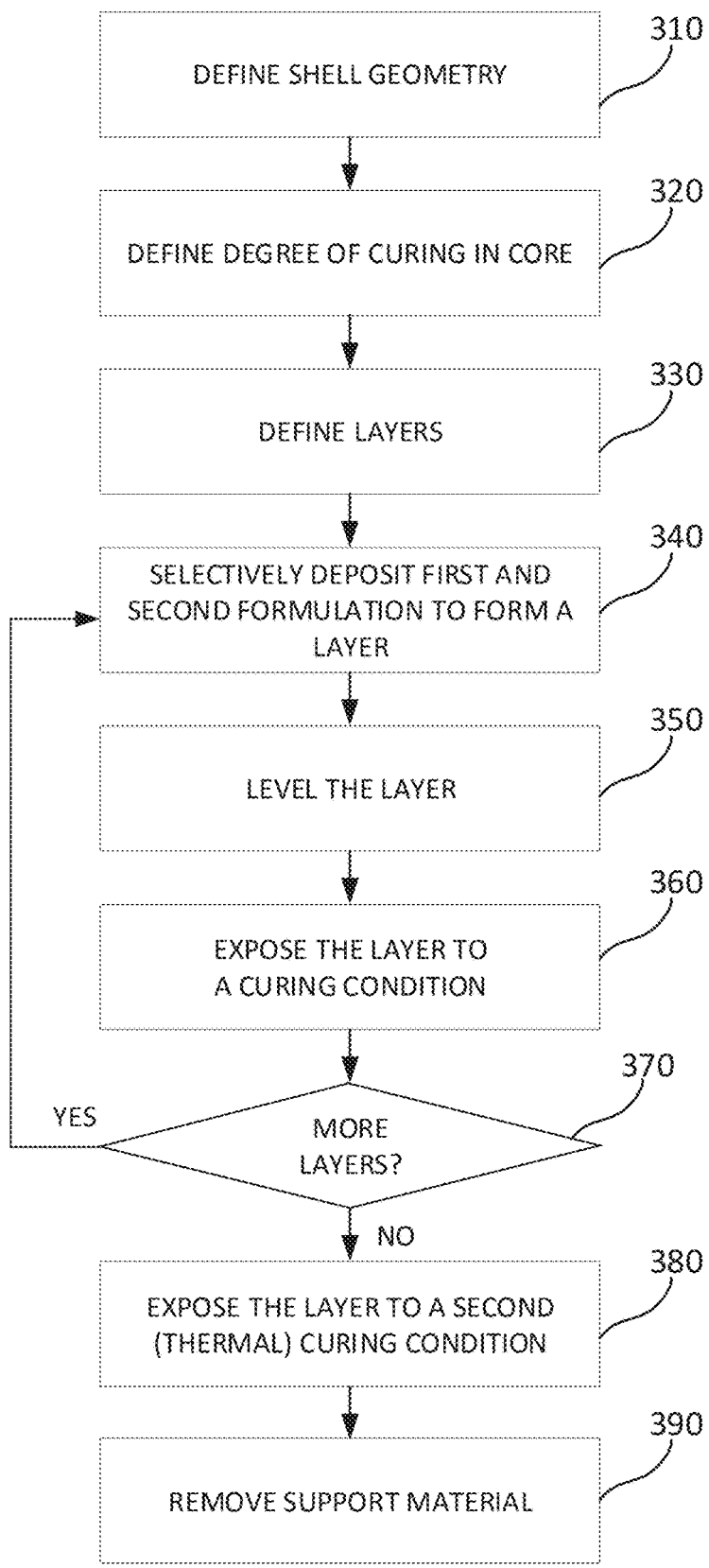
FIG. 8 is a simplified flow chart of an example method to fabricate an object with reduced asymmetrical shrinking in accordance with some example embodiments.

FIG. 8 is a simplified flow chart of an example method to fabricate an object with reduced asymmetrical shrinking in accordance with some example embodiments. According to some example embodiments, a data processor associated with an inkjet printing system is configured to receive object data and define geometry of a shell around the object (block 310). Defining geometry of the shell may include defining a thickness of the shell. Optionally the thickness may be selectively defined to vary based on the geometry of the object. The shell may be part of a volume of the object or may be external to the object and configured to be removed at the end of the AM process. In some example embodiments, a degree of desired solidification in the core may also be defined (block 320). The core may be formed by non-reactive formulation (a second formulation as described herein) or a combination of reactive and non-reactive formulation (e.g., either a first and second formulations as described herein, or sub-formulations of the second formulation as described herein). The degree of solidification of the core may be selectively defined based on adding a vol. % of the reactive formation in the core.

In some example embodiments, the model of the object including the defined shell and core is divided into printable layers (block 330). During printing, the printer selectively deposits the reactive formulation, the non-reactive formulation and support material per layer (block 340). Optionally, the layer is leveled (block 350) and then cured (block 360). This process may continue until all the layers are built (block 370). At the end of the layer building process, exposure to a second curing condition (e.g., thermal post treatment) (block 380) may be performed to complete solidification of the object, e.g. the core. Thermal post treatment may include for example heating the object for 1-10 hours at a temperature of 100° C. to 250° C., or 150° C. to 250° C. Thermal post treatment can be performed gradually, by heating to a first temperature in the above-indicated range for a first time period (e.g., 1-4 hours) and then to a second temperature, higher than the first temperature for a second time period (e.g., 1-4 hours) and optionally to a third, fourth, etc. temperature, for additional time periods. The support material when present may be removed before or after the exposure to the second curing condition (block 390). Alternatively, the second curing condition may be exposing the object to room temperature, e.g. 15° C.-30° C. for a defined period, e.g., 1-48 hours.

Figure 9:
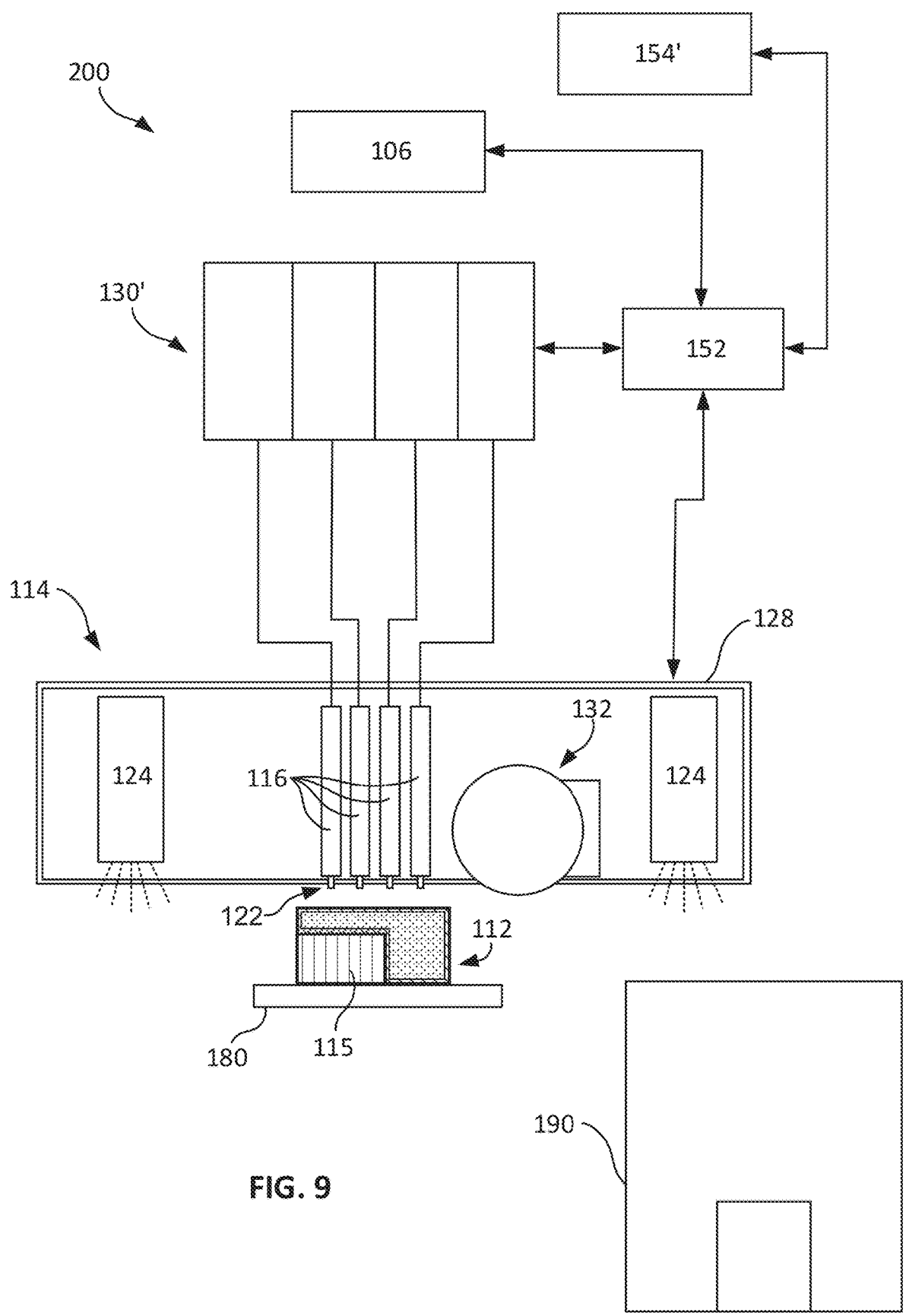
FIG. 9 is a simplified block diagram of an example ink-jet printing system for three dimensional printing in accordance with some example embodiments.

FIG. 9 is a simplified block diagram of an example ink-jet printing system for three dimensional printing in accordance with some example embodiments. According to some example embodiments, an ink-jet printing system 200 may be similar to inkjet system 100 but with a plurality of adaptions to configure the system for printing with materials according to the present embodiments (e.g., materials that have a relatively high HDT or that otherwise tend to shrink due solidification with solidification system 124, materials that form transparent objects, and any other materials and/or methods for which the present embodiments are beneficial, as described herein). According to some example embodiments, preferably a building material supply system or apparatus 130' contains at least one container or cartridge with building (e.g., modeling) material formulation that is of a non-reactive formulation (a second formulation as described herein) and another container or cartridge with building (e.g., modeling) material that is of a reactive formulation (a first formulation as described herein). According to some example embodiments, a data processor 154' is configured to obtain computer object data and to compute digital data defining a shell and a core of object 112. A thickness of the shell may be defined with data processor 154' based on the shape of object 112, the size of object 112 and material selected to fabricate object 112. In some example embodiments, parameters for dithering a reactive formulation as described herein in the core is also defined by data processor 154' also based on the shape of object 112, the size of object 112 and material selected to fabricate object 112. Parameters for dithering include vol. % of material dithered and may also include pattern for dithering. Optionally, the vol. % of material dithered may be different for different layers and may be adapted to the shape of object 112. Optionally, the pattern of material dithered may be different for different layers. In some example embodiments, data processor 154' may also be configured to define a mesh structure or an array of pillars within the core of object 112 that is formed from a reactive formulation. According to some example embodiments, ink-jet printing system 200 additionally includes a heating chamber 190 configured for receiving object 112 printed with inkjet printer 114 and post treating the object at the end of the AM process.

Figure 10:
FIG. 10 is an example pixel map for a curling bar model to be printed based on some example embodiments.

FIG. 10 is an example pixel map for a curling bar model to be printed based on some example embodiments. In the pixel map shown, the core includes 92 vol. % of a non-reactive formulation (shown in red), e.g., a sub-formulation of a second formulation as described herein, that is dithered with 8 vol. % of a reactive formulation (shown blue), e.g., another sub-formulation of a second formulation as described herein. In some example embodiments, the non-reactive formulation may be a modified formulation of TangoBlack™ and the reactive formulation may be VeroWhite™, both available by Stratasys® Ltd., Israel. The shell (shown in green) may be formed from a formulation that provides, when hardened, a relatively high HDT material. In the example shown, the shell is formed from RGD515™ as an example first formulation, also available by Stratasys® Ltd, Israel. Optionally, RGD515™ provides improved impact resistance.

Exemplary Configurations and Modeling Material Formulations

The additive manufacturing of the present embodiments employs a formulation system that comprises a first building (e.g., modeling) material formulation (herein also referred to as a first formulation), which is reactive towards a first curing condition and a second building (e.g., modeling) material formulation (herein also referred to as a second formulation), which is non-reactive or partially reactive towards a first curing condition, and is effected while controlling the curing parameters such that upon exposure to a first curing condition the first formulation hardens while the second formulation remains uncured or partially hardened, according to the configurations described hereinabove.

In some of any of the embodiments described herein, each of the first and second building material formulations is a modeling material formulation, which forms the final object.

According to some embodiments of the present invention, in at least a portion of the dispensed layers, the first and second formulations are dispensed as described herein, and exposed to a first curing condition. The first and the second building material formulations and the first curing condition are selected such that upon exposure to the first curing condition, the first building material formulation is hardened to a higher degree than the second building formulation. The first and the second building material formulations and the first curing condition are selected such that upon exposure to the first curing condition, the first building material formulation provides a hardened material having a high hardening degree, whereby the second building material formulation does not undergo hardening or provides a material with a hardening degree that is lower than that provided by the first formulation.

According to some embodiments of the present invention, the first and the second building material formulations and the first curing condition are selected such that upon exposure to the first curing condition, a hardening kinetic parameter of the first formulation is higher than that of the second formulation. In some embodiments, the hardening kinetic parameter is a rheological kinetic parameter such as a rate of a change in the viscosity of the formulation, and/or a rate of a change in the tan δ of the formulation. These kinetic parameters can be measured by methods known to those skilled in the art.

In some embodiments, a hardening kinetic parameter of the first formulation is higher than that of the second formulation by at least 2-folds, or at least 5-folds, or at least 10-folds.

A rate in the change of viscosity can be measured by measuring the viscosity of a formulation at a constant temperature and when exposed to the first curing condition at different time points. Viscosity can be measured, for example, on a Brookfield viscometer.

By "Tan δ", which is also known and used in the art as "tan delta", "tangent delta", "loss tangent", it is meant a ratio of loss modulus to storage modulus, or the tangent of the phase lag between the stress and the strain.

In some of any of the embodiments described herein, upon exposure to the first curing condition, the first formulation provides a material that features a hardening degree, as defined herein, that is higher by at least 50%, or at least 60%, or at least 70%, or at least 80%, or at least 90%, or more, than a hardening degree of a material that is formed upon exposing the second formulation to the first curing condition.

In some of any of the embodiments described herein, the first formulation is such that provides, upon exposure to the first curing condition, a hardening degree, as defined herein, of at least 50%, or at least 60%, preferably at least 70%, or at least 80%, or at least 90%, or even 100%. For example, in some embodiments, the first formulation comprises one or more curable materials which are polymerizable materials, and the hardening degree represents the mol % of the curable materials that polymerize upon exposure to the curing condition, such that at least 50 mol %, or at least 60 mol %, preferably at least 70 mol %, or at least 80 mol %, or at least 90 mol %, or all of the polymerizable materials, undergo polymerization to thereby provide a hardened first formulation. Since the first formulation undergoes a high degree of hardening when exposed to the first curing condition, it is referred to herein as a reactive formulation, that is, the first formulation is reactive towards hardening when exposed to the first curing condition.

In some of any of the embodiments described herein, the second formulation is such that provides, upon exposure to the first curing condition, a hardening degree, as defined herein, of no more than 50%, or no more than 40%, preferably no more than 30%, or no more than 20%, or no more than 10%, or no more than 5%, or even null. For example, in some embodiments, the second formulation comprises one or more curable materials which are polymerizable materials, and the hardening degree represents the mol % of the curable materials that polymerize upon exposure to the curing condition, such that at no more 50 mol %, or no more than 40 mol %, preferably no more than 30 mol %, or no more than 20 mol %, or no more than 10 mol %, or no more than 5 mol %, or none, of the polymerizable materials, undergo polymerization. Since the second formulation undergoes a low or null degree of hardening when exposed to the first curing condition, it is referred to herein as a non-reactive or partially-reactive formulation, that is, the second formulation is non-reactive or partially-reactive towards hardening when exposed to the first curing condition.

A hardening degree as defined herein can be determined or measured, for example, by determining a hardening parameter of the first and second formulations when exposed to the first curing condition.

The hardening parameter can be, for example, a rheological parameter such as the viscosity of the formulation upon exposure to the first curing condition, and/or the loss tangent (tan δ) of the formulation upon exposure to the first curing condition.

According to some embodiments of the present invention, the first and the second building material formulations and the first curing condition are selected such that upon exposure to the first curing condition, a change in a hardening parameter of the first formulation is higher than a change in a hardening parameter of the second formulation.

By "a change in a hardening parameter" in the context of "upon exposure to the first curing condition" it is meant a change in a hardening parameter, as described herein, during the time T, wherein T represents that time period from when the first curing condition is applied to a dispensed layer and until the following layer is dispensed.

According to some embodiments of the present invention, the first and the second building material formulations and the first curing condition are selected such that upon exposure to the first curing condition, a change in a viscosity of the first formulation is higher than a change in a viscosity of the second formulation.

According to some of these embodiments, a change in the viscosity of the first formulation is higher than that of the second formulation by at least 2-folds, or at least 5-folds, or at least 10-folds.

According to some of these embodiments, a change in the viscosity of the first formulation during the time T as defined herein is at least 2-folds, such that the viscosity of the first formulation increases by at least 2-folds or by at least 5-folds or by at least 10-folds. According to some of these embodiments, a change in the viscosity of the second formulation during the time T as defined herein is null, that is 1-folds, or is lower than 2-folds, and can be, for example, 1.1, 1.2, 1.3, 1.4 or 1.5-folds.

According to some embodiments of the present invention, the first and the second building material formulations and the first curing condition are selected such that upon exposure to the first curing condition, a change in a loss tangent of the first formulation is higher than a change in a loss tangent of the second formulation.

According to some of these embodiments, a change in the loss tangent of the first formulation is higher than that of the second formulation by at least 2-folds, or at least 5-folds, or at least 10-folds.

According to some of these embodiments, a change in the loss tangent of the first formulation during the time T as defined herein is of at least one unit, such that the loss tangent of the first formulation increases by at least one unit, or at least 2 units, or more. According to some of these embodiments, a change in the loss tangent of the second formulation during the time T as defined herein is null, or is lower than one unit, or lower than 0.5 units, and can be, for example, 0.1, 0.2, 0.3, 0.4 or 0.5 units.

In some of any of the embodiments described herein, the first and second formulations are curable formulations, each of which can form a hardened material when exposed to a suitable curing condition.

In some of any of the embodiments described herein, the first formulation hardens when exposed to the first curing condition, and the second formulation does not harden, or hardens to a lesser degree, as described herein, when exposed to the first condition and hardens or hardens further when exposed to a second curing condition that is different from the first curing condition. It is to be noted that in some embodiments, the first formulation can further harden when exposed to the second curing condition.

In some of any of the embodiments described herein, the first curing condition is optical radiation, as described herein, for example, a UV radiation, and the second curing condition is heat, as described herein. Alternatively, both the first and second curing conditions are optical radiation, and the first and second curing conditions differ in the type and/or wavelength of the optical radiation. Further alternatively, both the first and second curing conditions are heat, and the first and second curing conditions differ in the applied temperature. Further alternatively, the first curing condition is heat, as described herein and the second curing condition is optical radiation, as described herein, for example, a UV radiation.

In some of the embodiments where the first curing condition comprises optical radiation and the second curing condition comprises heat, the temperature at which the first curing condition is applied is lower by at least 50° C. or at least 100° C. from the temperature applied in the second curing condition In some of the embodiments where the first curing condition comprises heat and the second curing condition comprises optical radiation, the first curing condition is devoid of optical radiation, that is, no optical radiation is applied, and if the second curing condition comprises visible light, respective masking is affected.

In some of any of the embodiments described herein, the first formulation comprises one or more curable materials which are collectively referred to herein as a first curable material.

In some of any of the embodiments described herein, the second formulation comprises one or more curable materials which are collectively referred to herein as a second curable material.

In some of any of the embodiments described herein, the first curable material undergoes polymerization when exposed to the first curing condition, and the second formulation does not undergo polymerization or does not undergo complete polymerization, or undergoes polymerization to a degree that is lower than a polymerization degree of the first formulation, when exposed to the first condition and undergoes polymerization to a higher degree (e.g., complete polymerization) when exposed to the second curing condition that is different from the first curing condition. It is to be noted that in some embodiments, the first curable material undergoes further polymerization (to a higher degree) and/or cross-linking also when exposed to the second curing condition.

Each of the first and second formulations can further comprise, independently, one or more agents that promote the hardening of at least some of the curable materials, collectively referred to herein as an initiator. In some embodiments, the initiator initiates the polymerization and/or cross-linking of curable (e.g., polymerizable and/or cross-linkable) materials.

In the context of AM in general and the AM of the present embodiments, an initiator is a chemical material that initiates and/or facilitates (increases the rate of, and/or reduces the energy required for) the polymerization and/or cross-linking of polymerizable materials. Typically, the initiator generates a reactive species that initiates and/or facilitates (increases the rate of, and/or reduces the energy required for) the reaction. For example, initiators of free-radical polymerization generate a free radical, and the presence of the free radical initiates and/or facilitates the free-radical polymerization. Similarly, initiators of cationic polymerization generate a cation; initiators of anionic polymerization generate an anion; and other initiators form other species that initiate or facilitate polymerization.

The initiator can be active towards the polymerization when contacting a respective curable material, or, can be chemically inactive towards hardening of curable materials, for example, it does not initiate or facilitate the polymerization and/or cross-linking of polymerizable materials, without being exposed to a curing condition. The curing condition activates the initiator, typically such that it generates the reactive species which initiates and/or facilitates polymerization of respective polymerizable materials at its vicinity.

Initiators that are activated by irradiation are photoinitiators. Initiators that are activated by heat are thermal initiators. Initiators can alternatively be chemically activated by contacting another chemical agent, which is also known as an activator. Further alternatively, initiators can be activated by a curing condition, and generate a reactive species by contacting an activator.

The activity of an initiator (optionally in combination with an activator) towards hardening of formulations that comprise curable materials (e.g., towards polymerization and/or cross-linking) depends on the exposure to a condition that generates the reactive species, and/or on the relative amount or concentration of the initiator and the curable materials. When the concentration of an initiator is too low, its activity is low due to (i) small amount of the generated reactive species, which can be even smaller since the bulk of curable materials may mask the curing condition and reduce the amount of reactive species to be generated; and/or (ii) generation of low concentration of the reactive species in the bulk of curable materials results in lower amount of molecules of the respective curable material (or activator) that contact the reactive species for initiation and/or facilitation of the polymerization process.

In some of any of the embodiments described herein, an initiator is active towards polymerization of polymerizable materials (and thereby towards hardening of a formulation or formulation system comprising same) when it is capable to generate, preferably upon exposure to a suitable curing condition, reactive species at a concentration sufficient to induce polymerization of at least 50%, or at least 60%, or at least 70% of the polymerizable materials.

In some of any of the embodiments described herein, an initiator is inactive towards polymerization of polymerizable materials (and thereby towards hardening of a formulation comprising same) when it is incapable to generate, preferably upon exposure to a suitable curing condition, reactive species at a concentration sufficient to induce polymerization of at least 50%, or at least 60%, or at least 70% of the respective polymerizable materials.

In some of any of the embodiments described herein, an initiator is considered inactive or partially active towards polymerization of polymerizable materials (and thereby towards hardening of a formulation comprising same) when it generates, preferably upon exposure to a curing condition, reactive species at a concentration that induces polymerization of no more than 50%, or no more than 40%, or no more than 30%, preferably no more than 20%, or no more than 10%, or no more than 5%, or none, of the respective polymerizable materials.

The initiator can be inactive towards the polymerization when it is not exposed to a curing condition that generates a sufficient amount of reactive species and/or when it is present in a low concentration as described herein.

In some embodiments, the initiator is inactive when it is in an amount that is less than 50%, or less than 30%, or less than 10% by weight, or less than 5%, or less than 1% of an amount of the initiator required for promoting hardening of at least 70% of the second curable material upon exposure to the first curing condition.

The absolute amount of an initiator that is required for promoting hardening of at least 70% of the second curable material upon exposure to the first curing condition depends, at least in part, on the type of the second curable material and its consequent reactivity.

Typically, but not limiting, an initiator is active towards polymerization, as defined herein, when it is present at a concentration of from 0.5 to 5 weight percent relative to the total weight of the respective curable material(s), preferably at a concentration of from about 1 to about 3 weight percents, e.g., of 2.5 weight percent, and when it is exposed to a suitable curing condition.

Typically, but not limiting, an initiator is inactive or is partially active towards polymerization, as defined herein, when it is present at a concentration lower than 0.1, or lower than 0.05, e.g., of 0.025, weight percent relative to the weight of the respective curable material(s), even when it is exposed to a suitable curing condition.

In some of any of the embodiments described herein, an initiator is inactive towards hardening of the second formulation by being incapable of generating a sufficient amount of reactive species when exposed to the first curing condition.

In some of these embodiments, the initiator is in an amount sufficient to promote hardening of the second formulation when exposed to a curing condition other than the first curing condition. Alternatively, the initiator is in an amount that is insufficient to promote hardening of the second formulation even when exposed to a curing condition other than the first curing condition.

In some of any of the embodiments described herein, the first formulation is a photocurable formulation (e.g., UV-curable formulation) which comprises a photocurable material (e.g., UV-curable material and/or a photoinitiator for promoting the hardening) and the second curable formulation is a thermally curable formulation, which comprises a thermally-curable material and/or an agent that promotes hardening when exposed to heat). Alternatively, both the first and second formulations are UV-curable. Further alternatively, both the first and second formulations are thermally curable. Further alternatively, the first formulation is thermally curable and the second formulation is a photocurable formulation (e.g., UV-curable formulation).

In some of any of the embodiments described herein, the first formulation comprises a first curable material and one of the first and second formulations comprises an initiator that is active towards hardening of the first formulation, preferably upon exposure to a first curing condition.

In some of these embodiments, the initiator is included in the first formulation, and promotes the hardening of the first formulation once it is exposed to the first curing condition.

In some of these embodiments, the initiator is included in the second formulation and promotes the hardening of the first formulation when the first and second formulations are dispensed and contact one another, and preferably, are also exposed to the first curing condition. In some of these embodiments, the dispensing is such that the amount of the initiator in the second formulation and the ratio of the first and second formulations at a desired location are such that the initiator is active towards hardening of the first formulation, as defined herein, e.g., the initiator can generate, upon exposure to the first curing condition, a sufficient amount of reactive species relative to the amount of the first curable material, at the desired location, such that a degree of hardening of the first formulation at the desired location is as defined herein (e.g., at least 70%). Such embodiments are desirable when the curable materials are highly reactive such that hardening can occur even at the presence of minute amounts of reactive species, and hence it is desirable to separate the initiator from the respective first curable material before and during the dispensing of the formulations.

In some of any of the embodiments described herein, the second formulation comprises a second curable material and one of the first and second formulations comprises an initiator that is inactive or is partially active towards the hardening of the second formulation upon exposure to the first curing condition.

In some of these embodiments, the initiator is included in the second formulation, and is inactive towards promoting the hardening of the second formulation (e.g., does not generate a reactive species in a sufficient amount for initiating or facilitating polymerization of the second curable material) when it is exposed to the first curing condition.

In some embodiments, corresponding to the configuration shown in FIGS. 6A and 6B, the second material formulation forming the inner region comprises two sub-formulations referred to herein as sub-formulation A and B, each comprising the same second curable material (or a mixture of two or more second curable materials), whereby sub-formulation A hardens to a higher degree than sub-formulation B when exposed to the first curing condition.

In some of these embodiments, sub-formulation A comprises a second curable material and an initiator for promoting polymerization of the second curable material, as described herein, and the initiator is active towards promoting the polymerization of the second curable material when exposed to the first curing condition, as described herein in any of the respective embodiments and any combination thereof. In these embodiments, sub-formulation B comprises the second curable material and is either devoid of an initiator or comprises an initiator that is inactive towards polymerization of the second curable material when exposed to the curing condition, as described herein in any of the respective embodiments and any combination thereof. In some of these embodiments, sub-formulation B comprises an initiator that is active towards the polymerization of the second material but is in amount that generates, upon exposure to a curing condition, reactive species at a concentration that induces polymerization of no more than 50%, or no more than 40%, or no more than 30%, preferably no more than 20%, or no more than 10%, or no more than 5%, or none, of the second curable material.

In some of these embodiments, each of sub-formulations A and B comprises the same curable material and the same initiator, and the initiator is active when exposed to the first curing condition. In these embodiments, an amount of the initiator in sub-formulation A is higher by at least 100% of an amount of the initiator in sub-formulation B, and can be higher by 2-folds, 3-folds, 4-folds, and even more relative to the amount of the initiator in sun-formulation B. In some of these embodiments, a weight ratio of sub-formulations A and B is lower than 0.5, that is, a total amount of sub-formulation A in the inner region is no more than 50% by weight of the total amount of sub-formulation B in the inner region, and is preferably no more than 40%, or no more than 30%, or no more than 20%, or no more than 10%, or no more than 5%, or no more than 1%, and even less, by weight, of the total amount of sub-formulation B in the inner region.

The following describes exemplary formulation systems that are usable in the additive manufacturing of the present embodiments.

A first exemplary formulation system, also referred to herein as formulation system I, comprises a first formulation which comprises a first curable material (or a mixture of one or more first curable materials); and a second formulation which comprises a second curable material (or a mixture of one or more second curable materials), and the second curable material is different from the first curable material.

In some embodiments of exemplary formulation system I, the first formulation undergoes hardening of at least 70% when exposed to the first curing condition and the second formulation undergoes hardening of no more than 30% when exposed to the first curing condition.

In some embodiments of exemplary formulation system I, referred to herein as formulation system Ia, the first formulation further comprises a first initiator that is active towards hardening the first formulation when exposed to the first curing condition and the second formulation comprises a second initiator that is inactive towards hardening the second formulation when exposed to the first curing condition. The second initiator is different from the first initiator.

In exemplary embodiments of formulation system Ia, the first curing condition is irradiation (e.g., UV-irradiation) and the first formulation comprises a first curable material that is a photocurable material (e.g., UV-curable material) and a photoinitiator suitable for promoting hardening of the first formulation when exposed to the irradiation, in an amount the induces hardening of at least 70% of the first curable material. The second formulation comprises a second curable material and an initiator that is inactive, as described herein, when exposed to irradiation. In some embodiments, the initiator is a thermal initiator and the curable material is a thermally-curable material. In these embodiments, the second curing condition comprises application of heat energy. In some of these embodiments, the first curing condition does not comprise application of heat energy. For example, the first curing condition is applied at ambient temperature. In some embodiments, the first curing condition is effected at a temperature that is lower by at least 50° C. than a temperature applied for the second curing condition.

In some of the embodiments of exemplary formulation system Ia, the second formulation comprises two sub-formulations which comprise two curable systems: one curable system comprises a photocurable material, which can be the same or different from the first curable material in the first formulation and a photoinitiator that is active towards promoting polymerization of the respective curable material and another curable system comprises the thermally curable material and a thermally-activated agent for promoting polymerization of the thermally curable material. In some of these embodiments, sub-formulation A comprises the photocurable material and the agent that promotes polymerization of the second, thermally-curable material, and sub-formulation B comprises the thermally-curable material and the photoinitiator. The ratio between sub-formulation A and sub-formulation B is such that provides, upon exposure to the first curing condition, a hardening degree of the second formulation of no more than 50% or no more than 30%, as described herein.

In some embodiments of exemplary formulation system I, referred to herein as formulation system Ib, the first formulation further comprises a first initiator that is active towards hardening the first formulation when exposed to the first curing condition and the second formulation comprises a second initiator that is inactive towards hardening the second formulation when exposed to the first curing condition. The second initiator is the same as the first initiator, at least by being activated when exposed to the first curing condition.

In exemplary embodiments of formulation system Ib, the first curing condition is irradiation (e.g., UV-irradiation) and the first formulation comprises a first curable material that is a photocurable material (e.g., UV-curable material) and a photoinitiator suitable for promoting hardening of the first formulation when exposed to the irradiation, in an amount the induces hardening of at least 70% of the first curable material. The second formulation comprises a second curable material that is also a photocurable material (e.g., a UV-curable material) and a second initiator which is also a photoinitiator and is also activatable by the first curing condition and which can be the same as the first initiator or different. The amount of the second initiator in the second formulation is such that it is inactive or is partially active towards promoting hardening of the second formulation, as described herein. In some of these embodiments, the second curing condition is such that promotes hardening of the second formulation in the presence of the low amount of the second initiator, and can be, for example, application of heat. In some of these embodiments, the first curing condition does not comprise application of heat energy. For example, the first curing condition is applied at ambient temperature. In some embodiments, the first curing condition is effected at a temperature that is lower by at least 50° C. than a temperature applied for the second curing condition.

In additional exemplary embodiments of formulation system Ib, the first curing condition is heat energy at a first temperature and the first formulation comprises a first curable material that is a thermally curable material and a thermally-activatable initiator suitable for promoting hardening of the first formulation when exposed to the irradiation, in an amount the induces hardening of at least 70% of the first curable material. The second formulation comprises a second curable material that is also a thermally curable material and a second initiator which is also a thermally activatable initiator and is also activatable by the first curing condition and which can be the same as the first initiator or different. The amount of the second initiator in the second formulation is such that it is inactive or is partially active towards promoting hardening of the second formulation, as described herein. In some of these embodiments, the second curing condition is such promotes hardening of the second formulation in the presence of the low amount of the second initiator, and can be, for example, application of heat at a second temperature which is higher than the first temperature. In some embodiments, the first curing condition is effected at a temperature that is lower by at least 50° C. than a temperature applied for the second curing condition.

In some of any of the embodiments of formulation systems Ib, the first and second curable materials differ in at least one property of the hardened material formed thereby, for example, by HDT, Impact, elasticity, etc.

A second exemplary formulation system, also referred to herein as formulation system II, comprises a first formulation which comprises a first curable material (or a mixture of one or more first curable materials); and a second formulation which comprises a second curable material (or a mixture of one or more second curable materials), and the first and second curable materials are the same.

In some embodiments of exemplary formulation system II, the first formulation undergoes hardening of at least 70% when exposed to the first curing condition and the second formulation undergoes hardening of no more than 30% when exposed to the first curing condition.

In some embodiments of exemplary formulation system II, the first formulation further comprises a first initiator that is active towards hardening the first formulation when exposed to the first curing condition and the second formulation comprises a second initiator that is inactive towards hardening the second formulation when exposed to the first curing condition. The second initiator is the same as the first initiator, at least by being activated when exposed to the first curing condition.

In exemplary embodiments of formulation II, referred to herein as formulation system IIa, the first and second curable materials are UV-curable materials that feature, when hardened, the same or similar properties, and the first and second initiators are both photoinitiators. In some of these embodiments, the first curing condition is irradiation at a wavelength that activates the photoinitiator. In these embodiments, the amount of the second initiator in the second formulation is such that renders it inactive towards hardening of the second formulation when exposed to the first curing condition, as described herein.

In exemplary embodiments of formulation II, referred to herein as formulation system IIb, the first and second curable materials are UV-curable materials and/or thermally-curable materials, that feature, when hardened, the same or similar properties, and the first and second initiators are both thermally-activated initiators. In these embodiments, the first curing condition comprises heat at a temperature that activates the thermally-activated initiator. In these embodiments, the amount of the second initiator in the second formulation is such that renders it inactive towards hardening of the second formulation when exposed to the first curing condition, as described herein.

A third exemplary formulation system, also referred to herein as formulation system III, comprises a first formulation which comprises a first curable material (or a mixture of one or more first curable materials); and a second formulation which comprises a second curable material (or a mixture of one or more second curable materials), and the first and second curable materials can be the same or different from one another.

In some embodiments of exemplary formulation system III, the first formulation undergoes hardening of at least 70% when exposed to the first curing condition and the second formulation undergoes hardening of no more than 30% when exposed to the first curing condition.

In some embodiments of exemplary formulation system III, the first formulation further comprises a first initiator that is active towards hardening the first formulation when exposed to the first curing condition and the second formulation comprises a second initiator that is inactive towards hardening the second formulation when exposed to the first curing condition.

In exemplary embodiments of formulation III, referred to herein as formulation system IIIa, the first and second curable materials are UV-curable materials that feature, when hardened, the same or similar properties, and the first and second initiators are both photoinitiators. In some of these embodiments, the first curing condition is irradiation at a wavelength that activates the first photoinitiator but not the second photoinitiator. In some of these embodiments, the amount of the second initiator in the second formulation can be such that it is active towards hardening the second formulation when exposed to radiation at a suitable wavelength but is inactive towards hardening of the second formulation when exposed to the first curing condition, as described herein.

In exemplary embodiments of formulation III, referred to herein as formulation system IIIb, the first and second curable materials are UV-curable materials and/or thermally-curable materials, that feature, when hardened, the same or similar properties, and the first and second initiators are both thermally-activated initiators. In these embodiments, the first curing condition comprises heat at a temperature that activates only the first initiator. In these embodiments, the amount of the second initiator in the second formulation can be such that it is active towards hardening of the second formulation when exposed to a suitable curing condition that is other than the first curing condition but is inactive towards hardening of the second formulation when exposed to the first curing condition, as described herein. In some of these embodiments, the second initiator is activated when exposed to a temperature that is higher by at least 50° C. or at least 100° C. than a temperature at which the first initiator is activated.

According to the present embodiments, once the above-described formulations systems are dispensed and exposed to the first curing condition, the plurality of layers are exposed to a second curing condition, which is other than the first curing condition and is selected to increase the degree that the inner region is hardened.

In some of any of the embodiments described herein, the first curing condition is radiation and the second curing condition is heat, and the first and second formulations are selected accordingly, for example, in accordance with exemplary embodiments as described herein.

It is to be noted that whenever a formulation is described as reactive when exposed to irradiation, by, for example, comprising a photocurable material and/or a photoinitiator, the formulation is to be regarded as such that hardens when exposed to radiation at low temperatures, for examples, at a temperature lower than 100° C., or lower than 80° C., or lower than 70° C., or lower than 60° C., or lower than 50° C., or lower than 40° C. and even at room temperature. However, such formulations can also be reactive when exposed to heat, without irradiation at higher temperatures, for example, higher than 100° C., or higher. Thus, such formulations, which are reactive towards to hardening when exposed to a first curing condition which is irradiation, can undergo further hardening when exposed to a second condition which is heat.

It is to be noted that whenever a formulation is described as non-reactive or partially-reactive when exposed to irradiation, by, for example, comprising a photocurable material and/or a photoinitiator which is inactive towards promoting hardening the second formulation, the second formulation is to be regarded such that does not harden, or that hardens to a low hardening degree as defined herein, when exposed to radiation at low temperatures, for examples, at a temperature lower than 100° C., or lower than 80° C., or lower than 70° C., or lower than 60° C., or lower than 50° C., or lower than 40° C. and even at room temperature. However, such formulations can also be reactive when exposed to heat, without irradiation, at higher temperatures, for example, higher than 100° C., or higher. Thus, such formulations, which are non-reactive or partially-reactive towards to hardening when exposed to a first curing condition which is irradiation, can undergo hardening when exposed to a second condition which is heat.

The following describes exemplary curable materials and formulations systems comprising same, which are suitable for use in embodiments of the present invention.

According to some embodiments of the present invention, at least one of the first and second formulations provides a transparent material when hardened. An exemplary such formulation is prepared and marketed by the present assignee under the trade name VeroClear™.

In some of these embodiments, a formulation system comprises the first and second formulations as described herein and both provide, when hardened, a transparent material. Such a formulation system is an exemplary formulation system IIa as described herein, and can comprise, in some embodiments, the known transparent formulations as the first formulation, and, as the second formulation, a formulation that comprises the same curable materials but a low amount of a photoinitiator, as described herein.

According to some embodiments of the present invention, the second building material formulation comprises a curable material that exhibits volume shrinkage during the additive manufacturing process.

When curable materials that exhibit volume shrinkage during AM are used in a modeling material formulation for an AM process and the shrinkage is significant, the object tends to deform and curl up during the printing process. This may lead to skewing of the object geometry and detachment of the object from the surface on which it is printed and may cause an obstruction to the path of the print heads that deposit the model material. Striking of the print heads with the curled portion of the object may damage the print head. A degree of shrinkage may be defined with a threshold on a ratio of the volume of un-polymerized material over the volume of the polymerized material. In some examples, volume shrinkage can reach up to 20% (e.g., for some acrylic material).

The curling may be due to gradients in temperature that lead to gradients in degree of polymerization along the Z axis. Although, each layer deposited during the AM process is separately cured or hardened, the curing or hardening of a given layer may continue as one or more subsequent layers are added over the given layer. The continued curing or hardening may be due to penetration of curing radiation through layers and may also be due thermal energy that may accumulate in the object based on repeated curing or hardening of layers, based on an exothermic curing or hardening process, as well as based on a temperature at which the material is deposited. Temperature on an upper surface of a stack of layers may rise as additional layers are added until a steady state temperature is reached. Such temperature gradients tend to appear in the first number of layers deposited. In some example systems, steady state may be reached at or around 70° C., e.g. 60° C.-75°. This temperature may be reached at a height of 7-10 mm depending on the geometry of the printed portion of the object, parameters of the hardened material and parameters of the curing. When upper layers are warmer and experience a higher degree of curing or hardening as compared to the lower layers, the upper layers tend to shrink more as compared to the lower layers. The degree of curling may depend on gradient of shrinkage along the Z axis.

Glass transition temperature (Tg) may be used as a parameter to define expected curling during an AM process. Optionally, HDT may be additionally or alternatively used as the parameter to define expected curling during an AM process. Curling may occur when the material that is hardened by a curing process has a glass transition temperature (Tg) that is above the steady state temperature of the printed object, e.g. above 70° C. In such cases the polymer may not be able to relax its internal stresses at the steady state temperature. This may lead to curling. To alleviate the stresses additional thermal energy, in a form of heated tray, turning off the cooling fans, and/or heating with IR lamp may be required. However, raising the temperature may adversely affect the thermal stability of the dispensed formulation(s) and may at times lead to evaporation of the curable materials before curing or hardening takes place. For at least this reason, raising the temperature during the AM process may not be practical solution.

Curable materials that form, when hardened, a material with Tg that fall below the steady state temperature of the printed object do allow crawling and relaxation of internal stresses and therefore are not prone to shrinking.

According to some example embodiments, curling and/or deformation of materials with relatively high Tg and/or HDT is reduced or avoided by only partially curing or hardening at least a portion of the material during printing to obtain a green body object, and then completing the fabrication of the object by thermal post treatment.

As used herein, HDT refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods. In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

Herein, "Tg" of a material refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

According to some of any of the embodiments described herein, the second building material formulation comprises a second curable material featuring, when hardened, a heat distortion temperature (HDT) and/or Tg above a steady state temperature of the plurality of layers during the AM process.

According to some of any of the embodiments described herein, the second building material formulation comprises a second curable material featuring, when hardened, a heat distortion temperature (HDT) and/or Tg above 70° C.

According to some of any of the embodiments described herein, the first building material formulation comprises a first curable material featuring, when hardened, a heat distortion temperature (HDT) and/or Tg below a steady state temperature of the plurality of layers during the AM process.

According to some of any of the embodiments described herein the first building material formulation comprises a first curable material featuring, when hardened, a heat distortion temperature (HDT) and/or Tg below 70° C.

According to some of any of the embodiments described herein, the second building material formulation comprises a second curable material featuring, when hardened, a heat distortion temperature (HDT) and/or Tg above a steady state temperature of the plurality of layers during the AM process (e.g., above 70° C.), and the first building material formulation comprises a first curable material featuring, when hardened, a heat distortion temperature (HDT) and/or Tg below a steady state temperature of the plurality of layers during the AM process (e.g., below 70° C.).

Exemplary curable materials that provide hardened materials that exhibit volume shrinkage include, but are not limited to, cyanate esters, polyimide precursors (e.g., bismalimides), multi-functional acrylic materials, or other polymerizable systems that include C=C double bond opening during polymerization.

In some of any of the embodiments as described herein for materials that exhibit volume shrinkage, a formulation system I as described herein is usable. In example embodiments, the first formulation comprises acrylic-based UV-curable material(s), and the first curing condition comprises UV-irradiation, and the second formulation comprises a sub-formulation A which comprises acrylic-base curable material(s), preferably multi-functional acrylic-based UV-curable materials, and a sub-formulation B which comprises thermally-curable materials, for example, a cyanate ester. In some of these embodiments, an exemplary formulation system Ia as described herein is used.

In some of any of the embodiments as described herein for materials that exhibit volume shrinkage, a formulation system as described herein for exemplary formulation system Ic is usable. In some of these embodiments, both the first and second formulations comprise UV-curable acrylic-based materials, while the second formulation comprises acrylic-based materials that provide, when hardened, a material that exhibits high HDT and/or Tg, as described herein.

In some of any of the embodiments described herein for materials that exhibit volume shrinkage, a formulation system as described herein for exemplary formulation system IIa is usable.

In some of these embodiments, both the first and second formulations comprise a polyimide precursor (e.g., a bismalimide) in combination with a reactive diluent, whereby the second formulation comprises a low amount of initiator, as described herein.

Polyimide precursors typically include one or more imide moieties and one or more polymerizable moieties.

An imide moiety is a group that consists of two acyl groups bound to a nitrogen atom, —C(=O)—NRa—C(=O)—, wherein Ra can be, for example, hydrogen, alkyl, cycloalkyl, aryl, alkaryl, and any other substituent as defined herein for other chemical groups.

Exemplary polyimide precursors that are usable in the context of the present embodiments include, without limitation, α,ω-bismaleimides (BMIs).

α,ω-Bismaleimides feature two imide moieties which are linked to one another via a linking moiety and which further feature polymerizable moieties that undergo homopolymerization and/or copolymerization when exposed to UV irradiation, thermal energy and/or chemical catalysis, to thereby provide a cross-linked polyimide.

α,ω-Bismaleimides usable in the context of the present embodiments can be collectively represented by Formula I:

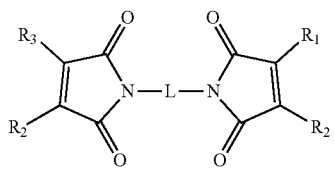

Formula I wherein:

L is a linking moiety which can be, or comprise, an alkyl, an aryl, a cycloalkyl, a hydrocarbon, as these terms are defined herein, or, alternatively, a heteroalicyclic, a heteroaryl, a poly(alkylene chain) and any combination of the foregoing; and $R_1$-$R_4$ are each independently selected from hydrogen, alkyl, cycloalkyl and optionally any other substituent as described herein.

Preferably, $R_1$-$R_4$ are each hydrogen.

The chemical composition and molecular weight of the linking moiety L determine the properties of the obtained polyimide.

In some embodiments, the L linking moiety is a hydrocarbon, as defined herein. In some embodiments, the hydrocarbon consists of one or more alkylene chains. In some embodiments, the hydrocarbon comprises two or more alkylene chains that are connected therebetween via a branching unit. In some embodiments, the branching unit comprises or consists of a cycloalkyl.

In some embodiments, the L linking moiety is represented by the Formula:

A1-B-A2 wherein A1 and A2 are each an alkylene chain and B is a branching unit. In some embodiments, B is a cycloalkyl, for example, a cyclohexyl, which is further substituted by one or more alkylene chains.

In some embodiments, A1 and A2 and optional alkylene chains substituting the cycloalkyl are each independently of 3 to 20 carbon atoms in length, or of 3 to 15, or of 3 to 10, or of 5 to 10, carbon atoms in length.

The term "branching unit" as used herein describes a multi-radical, preferably aliphatic or alicyclic group. By "multi-radical" it is meant that the linking moiety has two or more attachment points such that it links between two or more atoms and/or groups or moieties.

In some embodiments, the branching unit is derived from a chemical moiety that has two, three or more functional groups. In some embodiments, the branching unit is a branched alkyl or is a cycloalkyl as defined herein.

In some of any of the embodiments described herein, the linking moiety is selected such that the molecular weight of the BMI is in the range of from 200 to 5000 Daltons, preferably from 300 to 2000 Daltons, or from 300 to 1000 Daltons, of from 500 to 1000 Daltons.

An exemplary BMI includes BMI-689, having a molecular weight of 689 Daltons.

A formulation or formulation system (a combination of two or more sub-formulations) that comprises a polyimide precursor can further comprise an additional curable material, for example, a mono-functional or multi-functional acrylic material, as described herein, and/or an organic solvent.

Exemplary curable materials usable in combination with a polyimide precursor are described, for example, in WO 2019/130312 and WO 2019/130310.

Non-limiting examples of mono-functional acrylates include isobornyl acrylate (IBOA), isobornylmethacrylate, acryloyl morpholine (ACMO), phenoxyethyl acrylate, marketed by Sartomer Company (USA) under the trade name SR-339, urethane acrylate oligomer such as marketed under the name CN 131B, and any other acrylates and methacrylates usable in AM methodologies.

Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth) acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

Curable materials usable in the context of embodiments related to D-ABS formulation system are described, for example, in WO 2018/055521 and WO 2018/055522, which are incorporated by reference as if fully set forth herein.

The phrase "cyanate ester" encompasses one or more cyanate ester compound(s) and/or one or more prepolymer(s) thereof, including homoprepolymer(s) and/or heteroprepolymer(s).

The prepolymers comprise a cyanate ester that is polymerized to a degree of conversion of the cyanate groups of from 1 or 5 percent to 20 or 40 percent (of the initial cyanate functionality), leading to prepolymers with molecular weights of from 200 or 400 g/mol to 4,000 or 8,000 g/mol.

Cyanate ester compounds that are usable in the context of some of the present embodiments, as described herein, can be collectively represented by the following Formula:

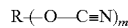

wherein:

m is an integer of from 1 to 6, and can be, for example, 1, 2, 3, 4, 5 or 6, preferably, 2, 3, 4 or 5, more preferably 2 or 3, for example 2; and R is alkyl, cycloalkyl, aryl, heteroaryl, or heteroalicyclic. Alternatively, R is a hydrocarbon (saturated or unsaturated) that is optionally interrupted and/or substituted by one or more heteroatoms such as Si, P, S, O, N.

In some embodiments, R is an aryl, for example, phenyl, naphthyl, anthryl, phenanthryl, or pyrenyl group, each being substituted or unsubstituted.

In some embodiments, R is an aryl such as phenyl, biphenyl, naphthyl, bis(phenyl)methane, bis(phenyl)ethane, bis(phenyl)propane, bis(phenyl)butane, bis(phenyl)ether, bis(phenyl)thioether, bis(phenyl)sulfone, bis(phenyl) phosphine oxide, bis(phenyl)silane, bis(phenyl)hexafluoropropane, bis(phenyl) trifluoroethane, or bis(phenyl)dicyclopentadiene, or a phenol formaldehyde resin, each being unsubstituted or substituted by, for example, 1-6 substituents.

Exemplary cyanate ester compounds include, but are not limited to, 1,3-, or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatoaphthalene; 2,2' or 4,4'-dicyanatobiphenyl; bis(4-cyanathophenyl) methane; 2,2-bis(4-cyanatophenyl)propane; 2,2-bis(3,5-dichloro-4-cyanatophenyl (propane. 2,2-bis(3-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl) phosphate; bis(3-chloro-4-cyanatophenyl)methane; 4-cyanatobiphenyl; 4-cumyl cyanato benzene; 2-tert-butyl-1,4-dicyanatobenzene; 2,4-dimethyl-1,3-dicyanatobenzene; 2,5-di-tert-butyl-1,4-dicyanatobenzene; tetramethyl-1,4-dicyanatobenzene; 4-chloro-1,3-dicyanatobenzene; 3,3',5, 5'-tetramethyl-4,4' dicyanatodiphenyl; bis(3-chloro-4-cyanatophenyl)methane; 1,1,1-tris(4-cyanato phenyl) ethane; 1,1-bis(4-cyanatophenyl)ethane; 2,2-bis(3,5-dichloro-4-cyanatophenyl)propane; 2,2-bis(3,5-dibromo-4-cyanatophenyl)propane; bis(p-cyanophenoxyphenoxy) benzene; and any mixture of the foregoing.

A cyanate ester of formula I in which m is 2 typically undergoes polymerization by forming a polycyanurate of the formula:

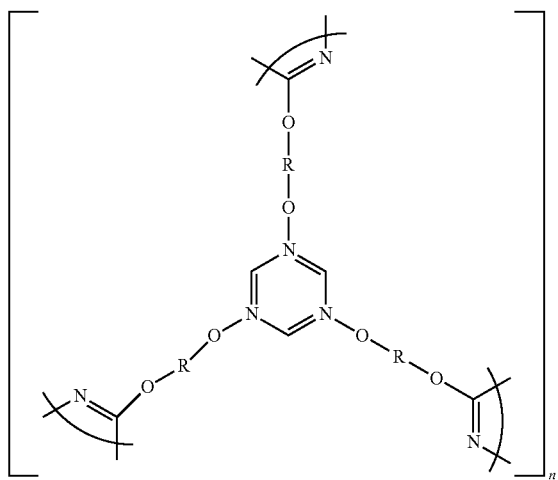

with R being as defined hereinabove.

When the second building material formulation comprises a cyanate ester, it preferably further comprises an agent for promoting polymerization of the cyanate ester, and, as described hereinabove, the agent is included in a sub-formulation that does not include the cyanate ester.

Agents for promoting polymerization of a cyanate ester are known in the art and all are suitable for use in the context of the present embodiments.

Exemplary such agents include compounds that comprise one or more nucleophilic groups.

According to some of any of the embodiments described herein, the agent for promoting polymerization of the cyanate ester is inactive (non-active, non-reactive) or is partially active (partially reactive) towards promoting polymerization of the cyanate ester prior to being exposed to the second curing condition.

According to some embodiments, the agent for promoting polymerization of the cyanate ester is activatable by exposure to the first curing condition and/or to the second curing condition.

According to some embodiments, the agent for promoting polymerization of the cyanate ester is activatable by exposure to the first curing condition and to the second curing condition.

According to some embodiments of the present invention, an agent that promotes polymerization of the first curable material (a cyanate ester) is a nucleophile, that is, a compound that comprises a nucleophilic group that is reactive towards cyanate ester. Exemplary nucleophilic groups include amines, thiolates, hydroxides, alkoxides, etc.

In exemplary embodiments, the agent that promotes polymerization of the first curable material is a thiol compound, that is, a compound that comprises one or more thiol groups.

As is known in the art, thiols can be activated to form a thiolate, which is a reactive nucleophilic species in the polymerization of cyanate esters.

In some embodiments, the thiol compound comprises one or more thiol groups attached to one or more carbon atoms, and these one or more carbon atoms are further substituted by e.g., an alkyl such as methyl.

Exemplary thiol compounds are those belonging to the family marketed under the trade name Karenz.

In some embodiments, a curable system of a cyanate ester that comprises a thiol compound as an agent that promotes polymerization of a cyanate ester, preferably further comprises an agent for generating a thiolate species.

In some embodiments, such an agent is a base, for example, an amine, preferably a tertiary amine.

In some embodiments, the agent that generates a thiolate is a photobase, which generates a base upon exposure to irradiation. An exemplary photobase is such that generates a base such as a tertiary amine upon exposure to irradiation.

In some embodiments, the second building material formulation comprises a cyanate ester as described herein, a thiol as an agent that promotes polymerization of a cyanate ester and a base for activating the thiol by generating a thiolate. In some of these embodiments, the cyanate ester and the base are included in one sub-formulation and the thiol is included in another sub-formulation.

In some of these embodiments, the base is a photobase that generates a tertiary amine when exposed to irradiation.

A thiol is an example of an agent for promoting polymerization of the cyanate ester that is activatable by exposure to the first curing condition (when a thiolate group is generated) and to the second curing condition (when the thiolate promotes the polymerization).

In exemplary embodiments, the agent that promotes polymerization of the first curable material is an amine, that is, a compound that comprises one or more amine groups.

The amine can be an aromatic or non-aromatic (aliphatic or alicyclic) amine.

The amine can be a primary, secondary or tertiary amine, and is preferably primary or secondary amine.

In some embodiments, the amine is an aromatic amine, comprising an aryl substituted by one or more amine groups and/or by one or more substituents that comprise an amine group, collectively referred to herein as amine-containing substituents, and optionally by one or more additional substituents. Each of the amine-containing substituent(s) can be independently a primary or secondary amine.

Exemplary aromatic amines are marketed under the trade name Ethacure 100 LC (primary amines), Ethacure 320 (primary amines) and Ethacure 420 (secondary amines).

In some embodiments, the amine is a secondary amine.

In some embodiments, the amine is a secondary aromatic amine, which comprises an aryl substituted by one or more amine-containing substituents, wherein one or more of the amine-containing substituents is a secondary amine.

An amine (e.g., as described herein) is active towards polymerization of a cyanate ester when exposed to heat, e.g., to a temperature of 80° C. or more.

An amine (e.g., an aromatic amine) is an example of an agent for promoting polymerization of the cyanate ester that is activatable by exposure to the second curing condition.

In some embodiments, a second building formulation comprises a cyanate ester as described herein, and an amine (e.g., an aromatic amine) as an agent that promotes polymerization of a cyanate ester. The cyanate ester is included in one sub-formulation and the amine is included in another sub-formulation.

In some of any of the embodiments described herein, the agent that promotes polymerization of the cyanate ester is inactive or is partially active, towards polymerization, as defined herein, when exposed to the first curing condition. In some embodiments, when the agent is activatable upon exposure to the first curing condition, it still remains inactive or partially active towards polymerization of the cyanate ester before being exposed to the second curing condition.

According to some of the present embodiments, the cyanate ester curable system is selected such that when the cyanate ester compound, the agent that promotes polymerization thereof and the agent that activates it, if present, contact one another and exposed to the first curing condition, polymerization of no more than 30%, or no more than 20% or no more than 10% of the cyanate ester occurs.

In some of any of the embodiments described herein, the agent that promotes polymerization of the cyanate ester is active towards the polymerization upon exposure to heat (heat energy), e.g., to elevated temperature as described herein (e.g., above 80° C. or above 100° C.).

In some of any of the embodiments described herein the second building material formulation that comprises a cyanate ester curable system further comprises another curable system which is a photocurable system, for example, a UV-curable system. The second curable system comprises a photocurable material, for example, a UV-curable material.

In some embodiments, the second curable system further comprises an agent that promotes polymerization of the UV-curable material. In exemplary embodiments, this agent is a photoinitator.

In some of any of the embodiments described herein, the agent the promotes polymerization of the UV-curable material is included in one sub-formulation and the UV-curable material is included in another sub-formulation.

In some of any of the embodiments described herein, one sub-formulation comprises a cyanate ester material and a photoinitiator and another sub-formulation comprises a UV-curable material and the agent that promotes polymerization of the cyanate ester. In some of these embodiments, the first sub-formulation further comprises an agent that activates the agent that promotes hardening of the cyanate ester.

In some of any of the embodiments described herein, the agent that promotes polymerization of the UV-curable material is inactive or is partially active, as defined herein, towards polymerization of the cyanate ester.

Exemplary such agents are devoid of a group that is active towards polymerization of the cyanate ester at the jetting temperature as described herein. In exemplary embodiments, such agents are devoid of a nucleophilic group as described herein. In some embodiments, it is devoid of a tertiary amine, and/or hydroxy and/or thiol and/or thioether. In some embodiments, it is devoid of hydroxy.

Exemplary photoinitators that are usable in the context of the present embodiments are described in the Examples section that follows.

In some embodiments, a UV-curable system comprises acrylic compounds and/or other photocurable materials that are polymerizable by free-radical polymerization and the photoinitator is a free-radical photoinitator.

A free-radical photoinitator may be any compound that produces a free radical on exposure to radiation such as ultraviolet or visible radiation and thereby initiates a polymerization reaction of the acrylic material, as long as it does not include, generate or require a nucleophile as described herein, and is preferably soluble in the cyanate ester.

Exemplary photoinitiators include benzophenones, aromatic α-hydroxy ketones, benzylketals, aromatic α-aminoketones, phenylglyoxalic acid esters, mono-acylphosphinoxides, bis-acylphosphinoxides, tris-acylphosphinoxides and/or oximesters derived from aromatic ketones.

Exemplary photoinitiators include, but are not limited to, camphor quinone; benzophenone, benzophenone derivatives, such as 2,4,6-trimethylbenzophenone, 2-methylbenzophenone, 3-methylbenzo-phenone, 4-methylbenzophenone, 2-methoxycarbonylbenzophenone 4,4'-bis (chloromethyl)-benzophenone, 4-chlorobenzophenone, 4-phenylbenzophenone, 3,3'-dimethyl-4-methoxy-benzophenone, [4-(4-methylphenylthio)phenyl]-phenylmethanone, methyl-2-benzoyl-benzoate, 3-methyl-4'-phenylbenzophenone, 2,4,6-trimethyl-4'-phenylbenzophenone, 4,4'-bis (dimethylamino)benzophenone, 4,4'-bis(diethylamino) benzophenone; thioxanthones, thioxanthone derivatives, polymeric thio-xanthones as for example OMNIPOL TX; ketal compounds, as for example benzyldimethyl-ketal (IRGACURE® 651); acetophenone, acetophenone derivatives, for example α-hydroxy-cycloalkyl phenyl ketones or α-hydroxyalkyl phenyl ketones, such as for example 2-hydroxy-2-methyl-1-phenyl-propanone (DAROCUR® 1173), 1-hydroxy-cyclohexyl-phenyl-ketone (IRGACURE® 184), 1-(4-dodecylbenzoyl)-1-hydroxy-1-methyl-ethane, 1-(4-isopropylbenzoyl)-1-hydroxy-1-methyl-ethane, 1-[4-(2-hydroxyethoxy)-phenyl]-2-hydroxy-2-methyl-1-propan-1-one (IRGACURE® 2959); 2-hydroxy-1-{4-[4-(2-hydroxy-2-methyl-propionyl)-benzyl]-phenyl}-2-methyl-propan-1-one (IRGACURE® 127); 2-hydroxy-1-{4-[4-(2-hydroxy-2-methyl-propionyl)-phenoxy]-phenyl}-2-methyl-propan-1-one; dialkoxyacetophenones, α-hydroxy- or α-aminoacetophenones, e.g., (4-methylthiobenzoyl)-1-methyl-1-morpholinoethane (IRGACURE® 907), (4-morpholinobenzoyl)-1-benzyl-1-dimethylaminopropane (IRGACURE® 369), (4-morpholinobenzoyl)-1-(4-methylbenzyl)-1-dimethylaminopropane (IRGACURE® 379), (4-(2-hydroxyethyl)aminobenzoyl)-1-benzyl-1-dimethylaminopropane), (3,4-dimethoxybenzoyl)-1-benzyl-1-dimethyl aminopropane; 4-aroyl-1,3-dioxolanes, benzoin alkyl ethers and benzyl ketals, e.g. dimethyl benzyl ketal, phenylglyoxalic esters and derivatives thereof, e.g., methyl α-oxo benzeneacetate, oxo-phenyl-acetic acid 2-(2-hydroxy-ethoxy)-ethyl ester, dimeric phenylglyoxalic esters, e.g. oxo-phenyl-acetic acid 1-methyl-2-[2-(2-oxo-2-phenyl-acetoxy)- propoxy]-ethyl ester (IRGACURE® 754); ketosulfones, e.g. ESACURE KIP 1001 M®; oxime-esters, e.g., 1,2-octane-dione 1-[4-(phenylthio)phenyl]-2-(O-benzoyloxime) (IRGACURE® OXE01), ethanone 1-[9-ethyl-6-(2-methyl-benzoyl)-9H-carbazol-3-yl]-1-(O-acetyloxime) (IRGACURE® OXE02), 9H-thioxanthene-2-carboxaldehyde 9-oxo-2-(O-acetyloxime), peresters, benzophenone tetracarboxylic peresters, monoacyl phosphine oxides, e.g. (2,4,6-trimethylbenzoyl)diphenylphosphine oxide (DAROCUR® TPO), ethyl(2,4,6 trimethylbenzoyl phenyl)phosphinic acid ester; bisacyl-phosphine oxides, e.g., bis(2,6-dimethoxybenzoyl)-(2,4,4-trimethyl-pentyl)phosphine oxide, bis(2,4,6-trimethylbenzoyl)-phenylphosphine oxide (IRGACURE® 819), bis(2,4,6-trimethyl-benzoyl)-2,4-dipentoxyphenylphosphine oxide, trisacylphosphine oxides, halomethyl-triazines, e.g., 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine, hexaarylbisimidazole/ coinitiators systems, e.g., ortho-chlorohexaphenyl-bisimidazole combined with 2-mercapto-benzthiazole, ferrocenium compounds, or titanocenes, e.g., bis(cyclopentadienyl)-bis(2,6-difluoro-3-pyrryl-phenyl)titanium (IRGACURE®784).

Exemplary alpha-hydroxy ketone PIs include, but are not limited to, 1-hydroxy-cyclohexyl-phenyl-ketone (IRGACURE® 184, I-184), 2-hydroxy-1-{1-[4-(2-hydroxy-2-methyl-propionyl)-phenyl]-1,3,3-trimethyl-indan-5-yl}-2-methyl-propan-1-one, (ESACURE ONE®), and 1-[4-(2-hydroxyethoxy)-phenyl]-2-hydroxy-2-methyl-1-propan-1-one (IRGACURE® 2959, 1-2959).

According to some of any of the embodiments described herein, the photoinitiator(s) comprises, or consists essentially of, a phosphine oxide-type (e.g., mono-acylated or bis-acylated phosphine oxide-type; BAPO or BPO) photoinitiator.

Exemplary monoacyl and bisacyl phosphine oxides include, but are not limited to, 2,4,6-trimethylbenzoyldiphenyl phosphine oxide, bis(2,4,6-trimethylbenzoyl) phenylphosphine oxide, dibenzoylphenylphosphine oxide, bis (2,6-dimethoxybenzoyl)phenyl phosphine oxide, tris(2,4-dimethylbenzoyl) phosphine oxide, tris(2-methoxybenzoyl) phosphine oxide, 2,6-dimethoxybenzoyldiphenyl phosphine oxide, 2,6-dichlorobenzoyldiphenyl phosphine oxide, 2,3,5,6-tetramethylbenzoyldiphenyl phosphine oxide, benzoyl-bis (2,6-dimethylphenyl) phosphonate, and 2,4,6-trimethylbenzoylethoxyphenyl phosphine oxide. Commercially available phosphine oxide photoinitiators capable of free-radical initiation when irradiated at wavelength ranges of greater than about 380 nm to about 450 nm include bis(2,4,6-trimethylbenzoyl)phenyl phosphine oxide (IRGACURE 819), bis(2,6-dimethoxybenzoyl)-(2,4,4-trimethylpentyl) phosphine oxide (CGI 403), a 25:75 mixture, by weight, of bis(2,6-dimethoxybenzoyl)-2,4,4-trimethylpentyl phosphine oxide and 2-hydroxy-2-methyl-1-phenylpropan-1-one (IRGACURE 1700), a 1:1 mixture, by weight, of bis(2,4,6-trimethylbenzoyl)phenyl phosphine oxide and 2-hydroxy-2-methyl-1-phenylpropane-1-one (DAROCUR 4265), and ethyl 2,4,6-trimethylbenzylphenyl phosphinate (LUCIRIN LR8893X).

Non-limiting examples of photoinitiators include acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, and bisacylphosphine oxide (BAPO's). Further examples include photoinitiators of the Irgacure® family.

In some of any of the embodiments described herein the UV-curable material is selected such that is provides, when hardened, a Tg of at least 150° C.

In some of any of the embodiments described herein, the UV-curable material comprises one or more, multi-functional curable materials.

In some of any of the embodiments described herein, the UV-curable material comprises one or more, multi-functional curable materials and at least one of these materials provides, when hardened, a Tg of at least 150° C.

In some of any of the embodiments described herein, the second curable material comprises one or more multi-functional curable materials and the type and amount of these materials are selected to provide, when hardened, an average Tg of at least 150° C.

Herein throughout, an average Tg means a sum of the Tg of each component multiplied by its relative weight portion divided by the sum of the respective weight portions.

For example, if material A is included in an amount of X weight percent and features Tg1, and a material B is included in an amount of Y weight percent and features Tg2, then an average Tg of materials A and B is calculated herein as:

Average $Tg=(X\times Tg1+Y\times Tg2)/X+Y$.

Exemplary difunctional curable materials which are usable in the context of the present embodiments are collectively represented by the following Formula:

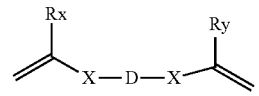

wherein:

X is selected from —O— and —O—C(=O)—;

D is a hydrocarbon as defined herein in any of the respective embodiments; and

Rx and Ry are each independently selected from hydrogen, alkyl and cycloalkyl.

When X is O, the difunctional curable material is a divinyl ether.

When X is —O—C(=O)— the difunctional curable material is a di(meth)acrylate.

When X is —O—C(=O)— and Rx and Ry are each hydrogen, the difunctional material is a diacrylate.

When X is —O—C(=O)— and Rx and Ry are each methyl, the difunctional material is a dimethacrylate.

In some of any of the embodiments described herein, the difunctional curable material is a divinyl ether as depicted in Formula II.

In some of any of the embodiments described herein, the difunctional curable material is a dimethacrylate as depicted in Formula II.

In some of any of the embodiments defined herein, the hydrocarbon is or comprises a rigid moiety, for example, a cyclic moiety such as a cycloalkyl (an alicyclic moiety) and/or an aryl (e.g., phenyl) or alkaryl (e.g., benzyl).

Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), Dipentaerythitol Penta-acrylate (DiPEP), and an aliphatic urethane diacrylate, for example, such as marketed as Ebecryl 230, ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

Examples of multi-functional (meth)acrylates that feature a Tg higher than 150° C. and are usable in the context of the respective embodiments include, but are not limited to, materials marketed by Sartomer under the trade names SR834, SR444D, SR368, SR833s, SR351, SR355 and SR299. Other materials are also contemplated.

In some embodiments, the UV-curable material comprises a di-functional acrylic material, preferably a di-functional acrylate or methacrylate.

In some embodiments, the UV-curable material comprises a di-functional acrylic material, preferably a di-functional acrylate or methacrylate, and another multi-functional acrylate or methacrylate, such as a tri-functional or tetra-functional acrylate or methacrylate.

In some of these embodiments, a weight ratio of the di-functional acrylate or methacrylate and the other multi-functional acrylate or methacrylate ranges from about 10:1 to 2:1, including any intermediate value and subranges therebetween.

The UV-curable material can alternatively be monofunctional or comprise one or more monofunctional curable materials such as monofunctional acrylates and/or methacrylates.

In some of any of the embodiments described herein, an amount of the agent that promotes polymerization of the cyanate ester ranges from about 5 to 25, or from about 8 to about 20, weight percents of the total weight of the second formulation or of the sub-formulation containing same, including any intermediate values and subranges therebetween.

In some of any of the embodiments described herein, an amount of the agent that promotes polymerization of the UV-curable material in the sub-formulation containing same ranges from about 1 to about 5 weight percents of the total weight of the formulation, including any intermediate values and subranges therebetween.

Formulation systems that comprise a cyanate ester may include, as an agent that promotes polymerization of the cyanate ester, a metal species, which is also referred to herein as a metal catalyst, instead of or in addition to a thiol or amine compound as described herein.

Any metal-based material that is known in the art to promote polymerization of a cyanate ester (as a metal catalyst) is contemplated. These include, for example, a chelate or oxide of a metal such as copper, zinc, manganese, tin, lead, cobalt, nickel, iron, aluminum, or titanium, or a metal salt of an organic acid, of which the metal is copper, zinc, lead, nickel, iron, tin, or cobalt.

The metal species is preferably not included in the formulation or sub-formulation that comprises the cyanate ester.

An exemplary metal species comprises a complex of zinc ions and an organic moiety, preferably a hydrophobic moiety.

In some embodiments, an amount of the metal species (metal catalyst) ranges from about 0.01 to about 0.5% by weight, or from about 0.01 to about 0.2% by weight, of the total weight of the formulation containing same.

Formulation systems that comprise a cyanate ester can further include an additional curable material which is capable of interacting with the cyanate ester to thereby form a co-polymeric network.

In some of these embodiments the additional curable material is capable of interacting with the cyanate ester upon exposure to the first and/or the second curing condition.

An exemplary such material is an epoxy-containing curable material.

Epoxy-containing curable materials comprise one or more curable epoxy groups which substitute an aromatic, aliphatic or alicyclic moiety.

Herein throughout, "an aromatic moiety" describes a moiety that is or comprises one or more aryl or heteroaryl groups.

Herein throughout, "an aliphatic moiety" or "non-aromatic moiety" describes a moiety that does not comprise an aryl or heteroaryl group, and which can be non-cyclic or cyclic, in which case it is also referred to herein as an alicyclic moiety.

In some of any of the embodiments described herein, the additional curable material features a viscosity lower than 1,000, or lower than 500, centipoises, at room temperature.

In some of any of the embodiments described herein, the epoxy-containing curable material features a viscosity lower than 1,000, or lower than 500, centipoises, at room temperature. Exemplary such materials are typically aliphatic or alicyclic epoxy-containing materials, which can be mono-functional or multi-functional.

Exemplary epoxy-containing curable materials include, but are not limited to, Bis-(3,4 cyclohexylmethyl) adipate, 3,4-epoxy cyclohexylmethyl-3,4-epoxycyclohexyl carboxylate, 1,2 epoxy-4-vinylcyclohexane, 1,2-epoxy hexadecane, 3,4-epoxy cyclohexylmethyl-3,4-epoxy cyclohexane carboxylate, which is available, for example, under the trade name UVACURE 1500 from Cytec Surface Specialties SA/NV (Belgium) and mono or multifunctional silicon epoxy resins such as PC 1000 which is available from Polyset Company (USA).

An amount of the additional curable material can be selected as desired and in accordance with considerations such as the mechanical properties of the obtained cyanate ester-containing polymeric network and costs.

In some of these embodiments, a weight ratio of the sub-formulations in the second building material formulation ranges from about 80:20 to about 20:80 or from about 70:30 to 30:70, or from about 70:30 to 50:50, including any intermediate values and subranges therebetween.

In some of any of the embodiments described herein, the first and/or second building material formulation independently further comprises one or more additional materials, which are referred to herein also as non-reactive materials (non-curable materials).

Such materials include, for example, surface active agents (surfactants), inhibitors, antioxidants, fillers, pigments, dyes, and/or dispersants.

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

Suitable dispersants (dispersing agents) can also be silicone materials, for example, organic polysiloxanes such as PDMS and derivatives therefore, such as those commercially available as BYK type surfactants.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a surfactant and/or a dispersant and/or a stabilizer and/or a filler, if present, ranges from 0.01 to 2%, or from 0.01 to 1%, by weight, of the total weight of the respective formulation. Dispersants are typically used at a concentration that ranges from 0.01 to 0.1%, or from 0.01 to 0.05%, by weight, of the total weight of the respective formulation.

In some embodiments, the first and/or second formulation further comprises an inhibitor.

The inhibitor is included for preventing or reducing curing before exposure to a curing condition. Suitable inhibitors include, for example, those commercially available as the 'Genorad' type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, the pigment's concentration ranges from 0.1 to 2% by weight, or from 0.1 to 1.5%, by weight, of the total weight of the respective formulation.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein there is provided a kit comprising a first formulation and a second formulation (including sub-formulations A and B) as described herein in any of the respective embodiments and any combination thereof.

In some embodiments, each formulation is packaged individually in the kit.

In exemplary embodiments, the formulations are packaged within the kit in a suitable packaging material, preferably, an impermeable material (e.g., water- and gas-impermeable material), and further preferably an opaque material. In some embodiments, the kit further comprises instructions to use the formulations in an additive manufacturing process, preferably a 3D inkjet printing process as described herein. The kit may further comprise instructions to use the formulations in the process in accordance with the method as described herein.

It is expected that during the life of a patent maturing from this application many relevant curable materials and/or respective agents for promoting polymerization of curable materials will be developed and the scope of the terms first curable material, second curable material and agents promoting polymerization thereof is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "(meth)acrylic" encompasses acrylic and methacrylic materials.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 30, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group. Dimethylenecyclohexane is an example of a hydrocarbon comprised of 2 alkyl groups and one cycloalkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein. The term alkoxide describes —R'O$^-$ group, with R' as defined herein.

The term "aryloxy" describes both an —O-aryl and an —O-heteroaryl group, as defined herein.

The term "thiohydroxy" or "thiol" describes a —SH group. The term "thiolate" describes a —S$^-$ group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'—linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find support in the following examples.

EXAMPLES

Reference is now made to the following examples, which together with the above descriptions illustrate some embodiments of the invention in a non-limiting fashion.

Materials and Methods

All objects were printed using PolyJet™ Printer available by Stratasys® Ltd., Israel, unless otherwise indicated.

Curling bars as described herein are rectangular objects having the following dimensions: 25×1×1 cm.

RGD515, VeroWhite, and RGD537™ are acrylic-based, UV-curable formulations, prepared and marketed by the present assignee.

Other formulations are described hereinunder.

UV curing was performed using mercury lamp.

Thermal curing was performed in a standard laboratory oven.

Example 1

Formulation Systems Comprising a Cyanate Ester Curable Material and an Acrylic Curable Material An exemplary formulation system comprising a cyanate ester curable material (featuring high HDT, as defined herein) and an acrylic curable material (featuring high Tg, as defined herein) was used as the second building material formulation.

This formulation system generally includes two modeling material sub-formulations as follows: the sub-formulation A comprises acrylic UV-curable materials and an agent that promotes polymerization of a cyanate ester, and the sub-formulation B comprises a thermally curable cyanate ester and a photoinitiator that promotes curing of the acrylic materials.

Table 1A below presents the composition an exemplary sub-formulation A, and Table 1B below presents the composition of an exemplary sub-formulation B.

TABLE 1A

| Component | Wt. % |
|---|---|
| Aromatic amine-containing activator for CE curing | 5-10 |
| Difunctional methacrylate monomer featuring Tg >150° C. | 65-75 (e.g., 70-75) |
| Trifunctional acrylate oligomer featuring Tg >150° C. | 10-30 (e.g., 15-25) |
| Surface active agent | 0.01-0.1 |

TABLE 1A-continued

| Component | Wt. % |
|---|---|
| Properties | |
| Visc. (68° C.) | about 18.5 cP |
| Surface Tension | about 29 dyne/cm |

TABLE 1B

| Component | Wt. % |
|---|---|
| Cyanate ester resin | 95-99 |
| Surface active agent | 0.05-0.5 (e.g., 0.1-0.3) |
| Photoinitiator (e.g., Irgacure369 + ITX-2) | 1-2 |
| Properties | |
| Visc. (68° C.) | 20.7 cP |
| Surface Tension | 28 dyne/cm |

The first formulation, forming a shell enveloping the inner region, generally comprises one or more acrylic materials and a photoinitiator in an amount that renders the formulation active towards hardening when exposed to UV-irradiation.

Objects were manufactured in accordance with the present embodiments, while dispensing each formulation and sub-formulation from a different inkjet printhead or a different nozzle, and exposing each of the dispensed layers to UV irradiation as described herein, to thereby obtain green body object having a shell formed with the acrylic materials (the first formulation), and a core formed of sub-formulations A and B, comprising non-cured or partially cured cyanate ester monomers and cured acrylic materials.

The resulted printed green body objects were post cured at elevated temperatures, as follows: 2 hours at 100° C., followed by 2 hours at 2 hr-150° C., followed by two hours at 200° C., followed by 4 hours at 220° C.

Figure 11A:
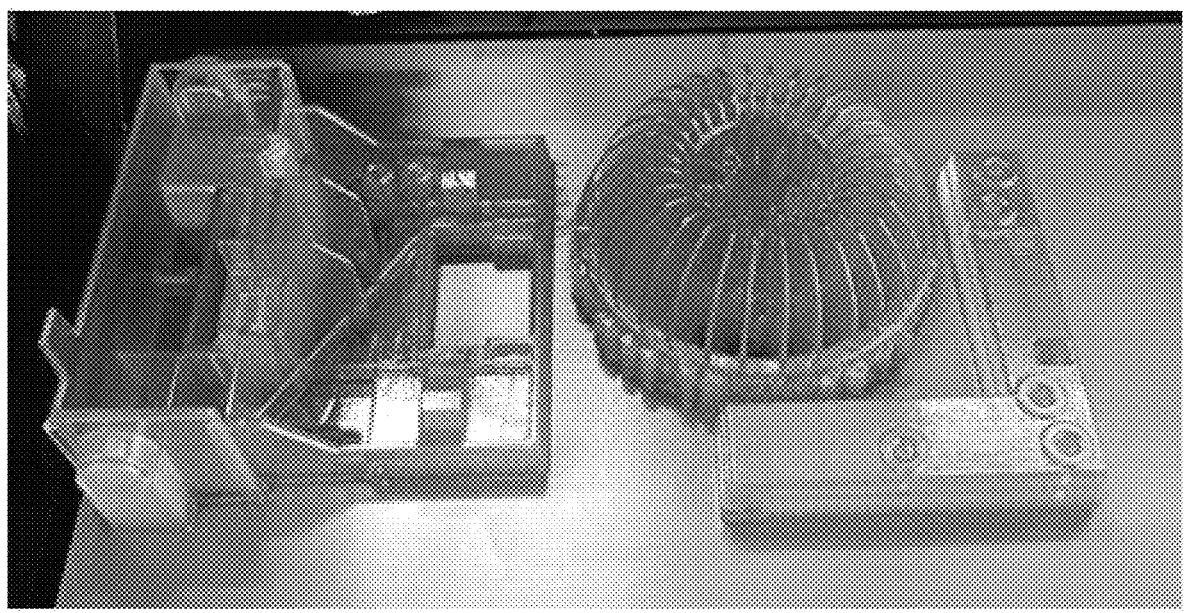
FIGS. 11A and 11B are images of example objects printed with cyanate ester-containing formulation system in accordance with some example embodiments.

FIG. 11A presents a photograph of green body objects that were obtained while using as the second formulation the formulation system described in Tables 1A and 1B, and as the first formulation the formulation marketed as RGD515.

Figure 11B:
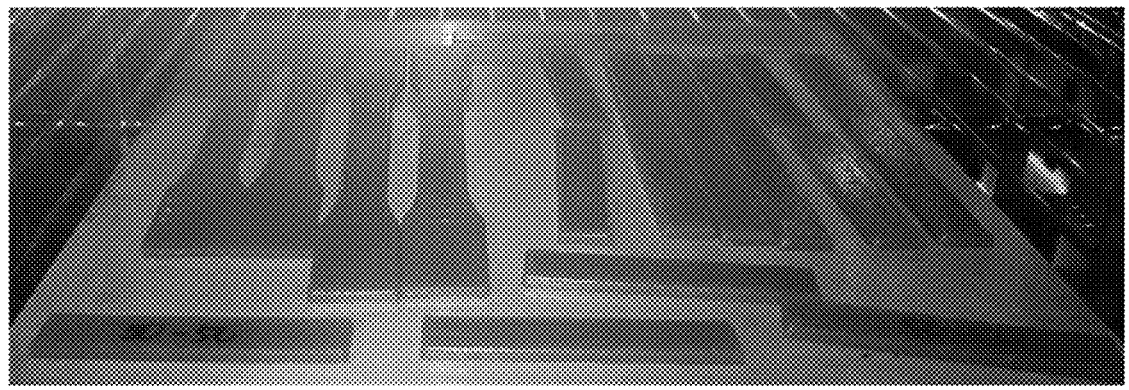

FIG. 11B presents a photograph of green body objects that were obtained while using as the second formulation the formulation system described in Tables 1A and 1B, and as the first formulation the formulation marketed as RGD515, while being subjected to the second curing condition.

The final HDT of the printed part is above 250° C.

Figure 11C:
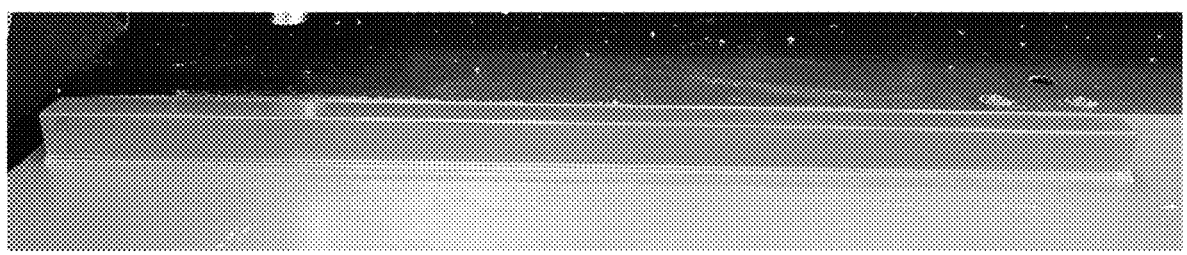
FIGS. 11C and 11D are images of a curling bar manufactured by AM as a green body object and hardened in a thermal post process respectively and in accordance with some example embodiments.
Figure 11D:
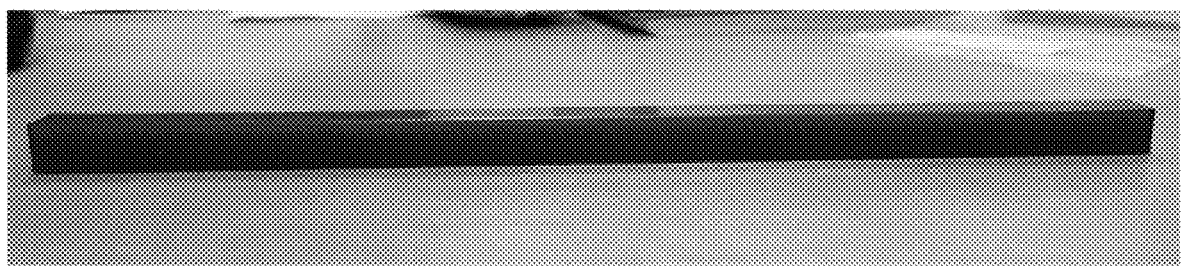

FIGS. 11C and 11D present photographs of a curling bar manufactured by AM as a green body object, and hardened in a thermal post process, respectively.

Tables 1C and 1D below present the composition of additional exemplary sub-formulations A and B, respectively.

TABLE 1C

| Component | Wt. % |
|---|---|
| Difunctional methacrylate monomer featuring Tg >150° C. | 60-80 (e.g., 70-75) |
| Secondary amine-containing activator for CE curing | 5-15 (e.g., 5-10) |
| Metal catalyst | 0.1-0.2 |
| Surface active agent | 0.01-0.1 |

TABLE 1C-continued

| Component | Wt. % |
|---|---|
| Trifunctional acrylate oligomer featuring Tg >150° C. ( | 10-30 (e.g., 15-25) |
| Antioxidant | 0.01-0.1 |

TABLE 1D

| Component | Wt. % |
|---|---|
| Cyanate ester resin | 95-99 |
| Surface active agent | 0.05-0.5 (e.g., 0.1-0.3) |
| Photoinitiator (e.g., phosphine oxide type) | 1-2 |

Tables 1E and 1F below present the composition of additional exemplary sub-formulations A and B, respectively.

TABLE 1E

| Component | Wt. % |
|---|---|
| Difunctional methacrylate monomer featuring Tg >150° C. | 30-50 (e.g., 35-45) |
| Secondary amine-containing activator for CE curing | 1-10 |
| Metal catalyst | 0.05-0.15 |
| Cycloaliphatic di-functional Epoxy resin | 30-50 (e.g., 35-45) |
| Surface active agent | 0.01-0.1 |
| Trifunctional acrylate oligomer featuring Tg >150° C. | 10-20 (e.g., 10-15) |
| Antioxidant | 0.01-0.1 |

TABLE 1F

| Component | Wt. % |
|---|---|
| Cyanate ester resin | 95-99 |
| Surface active agent | 0.05-0.5 (e.g., 0.1-0.3) |
| Photoinitiator (e.g., phosphine oxide type) | 1-2 |

Example 2

Formulation Systems Comprising Acrylic Materials

An exemplary formulation system usable for printing objects in a D-ABS (core-shell) mode, as described, for example, in US Patent Application Pub. No. 2013/0040091 and in WO 2018/055522, which are incorporated by reference as if fully set forth herein, was first tested. The formulation system includes two acrylic based formulations: A first formulation that forms a reinforcer material featuring high HDT and a DLM material that forms a hardened material that features high Impact resistance and low HDT. In a core-shell D-ABS mode, the formed objects typically have a shell made of the DLM material and a core made of the reinforcer.

Figure 12A:
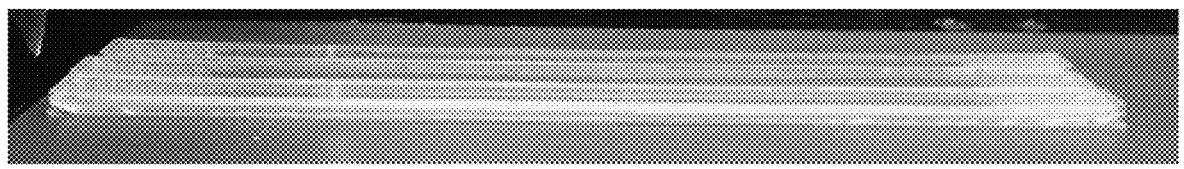
FIGS. 12A and 12B are pairs of example curling bar models printed with acrylic-based formulation that provide high HDT material in accordance with some example embodiments.

FIG. 12A shows curling bar models that were printed with a reinforcer formulation known as DR-83 (RGD 537) that has an HDT of about 140° C. when hardened and a shell made of RGD515 as the DLM material. The reinforcer formulation was a 100% reactive formulation, comprising 3-4 weight percents of a photoinitiator. Significant curling and detachment of the bars from the printing surface can be observed. The printing stopped after 4 mm due to the curling and the potential risk to the print heads.

Figure 12B:
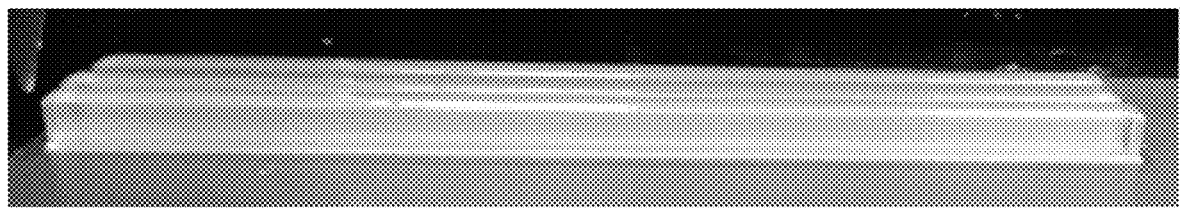

FIG. 12B shows the results of printing the same objects with an inner core made of a modified acrylic reinforcer formulation system that comprises a sub-formulation A which is similar to DR-83, and a sub-formulation B which is similar to DR-83, features high HDT, but lacks a photoinitiator. The volume percents of the sub-formulations A and B were 4% and 96%, respectively. The shell is made of RGD515. The curling bar model in FIG. 12B shows little to no curling. Sub-formulation B was dispensed in a layer-wise manner to form the layer-wise patterns of the inner core and sub-formulation A was dithered in the layer-wise patterns of the inner core.

The present inventors have designed formulations containing a polyimide precursor such as a bismalimide, which forms a high HDT material when hardened. These formulations are usable in 3D inkjet printing when further comprising a reactive diluent, as defined herein and described in U.S. Provisional Patent Application No. 62/610,984, filed Dec. 17, 2017, the contents of which are incorporated as if fully set forth herein.

Figure 13A:
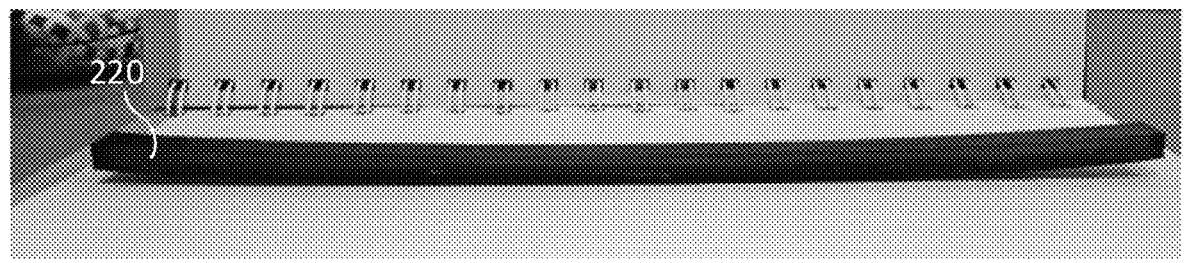
FIGS. 13A and 13B are example curling bar models printed with BMI-containing formulation in accordance with some example embodiments.

Curling bar models were printed with an exemplary bismaleimide-containing formulation which comprises BMI-689 (marketed by Designer Molecules Inc.), about 79-80%, and cyclohexyl dimethanol divinyl ether (about 19-20%), and 1% photoinitiator. The printing was terminated after 3.5 mm due to significant curling that risk to the print heads due to the curling. FIG. 13A presents the curling bar that is obtained.

Figure 13B:
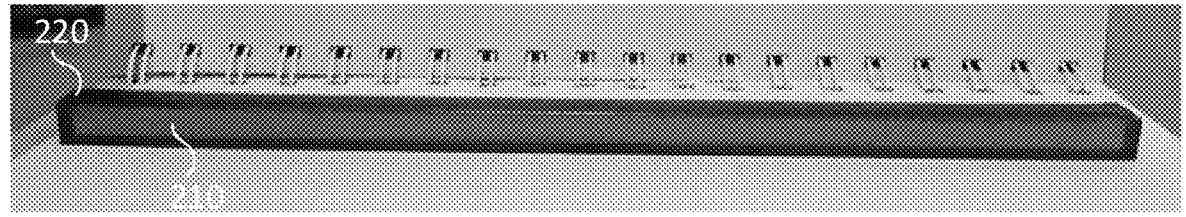

FIG. 13B shows a bar formed in accordance with some embodiments of the present invention. In FIG. 13B a formulation as used in FIG. 13A was employed as the shell having 0.3 mm thickness, and a formulation devoid of a photoinitiator was employed for forming the core. Based on this configuration, no-curling was observed.

Example 3

Transparent Formulation Systems

Transparent rectangular objects were printed using reactive VeroClear reference acrylic-based formulations, comprising 1.2 and 2 weight percents of a photoinitiator, and the same formulations when used in a core-shell configuration according to the present embodiments, wherein the first formulation is similar to the reference formulations and forms the outer region, and the second formulation comprises the same curable components and the same photoinitiator, the latter being in an amount of 0.5 and 0 weight percents. The obtained green bodies were subjected to curing by exposure to daylight lamp for 6 hours.

Figure 14:
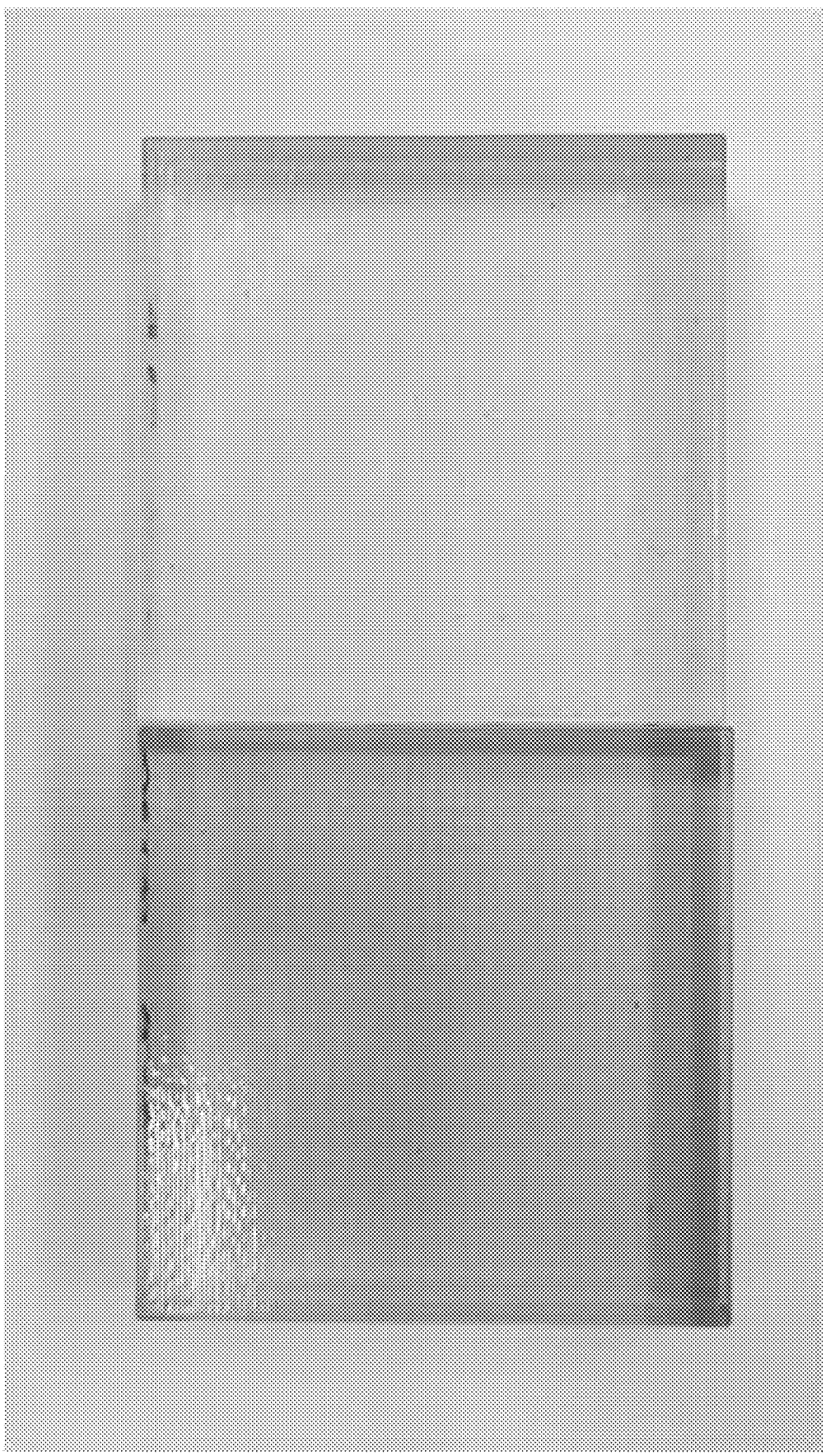
FIG. 14 is an image of example transparent objects printed with acrylic-based formulations in accordance with some example embodiments.

FIG. 14 presents photographs of the obtained objects, showing that objects printed according to embodiments of the present invention feature reduced undesired color and improved transparency. Left object was printed with the reference VeroClear formulation and the right object was printed according to the present embodiments, using VeroClear as the outer layer, having 0.5 mm thickness, and with similar formulations having 0.5% or 0% by weight of a photoinitiator as sub-formulations A and B in the inner region.

Example 4

High Throughput Printing

Objects may be manufactured with higher throughput using methods described herein. As described herein, printing a portion of the object, e.g. a core of the object with the second building material formulation provides for reducing the temperature buildup over the AM process. Based on the reduced temperature buildup achieved, the speed of the scanning and the throughput may be increased. Smearing of the object details during the AM process may be avoided based on printing a relatively hard shell or relatively hard coating (a solidified shell or coating) that forms an exterior of the object with the first building material formulation as described herein. The shell or coating used for high throughput applications may be selectively defined to be thicker than the shell or coatings that are used in other applications, e.g. applications for reducing curling and improving transparencies. Optionally, the shell or coating may be 0.5 mm-2 mm as opposed to 0.15 mm-0.3 mm that may typically be used in other applications. In some example embodiments, the printed object may be exposed to a post treatment process in a high throughput printing application. Alternatively, a post treatment process is actuated.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of manufacturing a three-dimensional object via additive manufacturing (AM), the method comprising:
    dispensing a first building material formulation to form an outer region, and dispensing a second building material formulation to form an inner region, the outer region surrounding the inner region, the inner and outer regions being shaped to form a layer of the object;
    exposing the layer to a first curing condition, wherein the first and the second building material formulations and the first curing condition are selected such that upon the exposing to said first curing condition, the first building material formulation is polymerized to a higher degree than the second building formulation,
    repeating the dispensing and the exposing to the first curing condition to sequentially form a plurality of layers of the object, wherein the outer regions form a hardened coating that at least partially encapsulates the inner regions; and
    collectively exposing the plurality of layers to a second curing condition, wherein the second curing condition is other than the first curing condition and wherein the second curing condition is selected to increase a degree that the inner region is hardened by polymerization and/or cross-linking,
    wherein the first building material formulation comprises a first curable material which is a UV curable material, and a photo-initiator in an amount that ranges from 1 to 3 weight percent of the total weight of the first building material formulation, and the second building material formulation comprises a second curable material which is a UV curable material, and a photo-initiator in an amount that is less than 50% of said amount of the photo-initiator in the first building material formulation,
    wherein each of the first and second building material formulations provides a transparent hardened material, and
    wherein said first curing condition comprises UV-irradiation.

2. The method of claim 1, wherein the second building material formulation comprises at least a sub-formulation A and a sub-formulation B, each comprising the second curable material, wherein an amount of the photo-initiator in sub-formulation A ranges from 1 to 3 weight percent of the total weight of sub-formulation A, and an amount of the photo-initiator in sub-formulation B is less than 50% of the amount of the photoinitiator in sub-formulation A, and wherein an amount of sub-formulation A in the inner region is no more than 50% by weight of an amount of sub-formulation B in the inner region.

3. The method of claim 2, wherein dispensing the second building formulation is such that the sub-formulation A is dithered within the inner region.

4. The method of claim 1, wherein said second curable material features, when hardened, at least one of:
    a heat distortion temperature (HDT) above a steady state temperature of the plurality of layers during the AM process;
    a glass transition temperature (Tg) above a steady state temperature of the plurality of layers during the AM process;
    a heat distortion temperature (HDT) above 70° C.; and
    a glass transition temperature (Tg) above 70° C.

5. The method of claim 1, wherein said first curable material features, when hardened, at least one of:
    a heat distortion temperature (HDT) below a steady state temperature of the plurality of layers during the AM process;
    a glass transition temperature (Tg) below a steady state temperature of the plurality of layers during the AM process;
    a heat distortion temperature (HDT) below 70° C.; and
    a glass transition temperature (Tg) below 70° C.

6. The method of claim 1, wherein the coating is configured to have a thickness that is less than 1 mm.

* * * * *